US008553165B2

(12) United States Patent
Xi et al.

(10) Patent No.: US 8,553,165 B2
(45) Date of Patent: Oct. 8, 2013

(54) LIQUID CRYSTAL DISPLAY PANEL, PIXEL ARRAY SUBSTRATE AND PIXEL STRUCTURE THEREOF FOR SOLVING GREENISH PROBLEM

(75) Inventors: Peng-Bo Xi, Hsin-Chu (TW); Yi-Jen Chen, Hsin-Chu (TW); Shin-Hung Yeh, Hsin-Chu (TW); Ya-Ling Hsu, Hsin-Chu (TW); Wei-Kai Huang, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 259 days.

(21) Appl. No.: 13/027,247

(22) Filed: Feb. 14, 2011

(65) Prior Publication Data

US 2012/0026444 A1 Feb. 2, 2012

(30) Foreign Application Priority Data

Jul. 29, 2010 (TW) .................. 99125134 A

(51) Int. Cl.
G02F 1/1343 (2006.01)
G02F 1/13 (2006.01)
G09G 3/36 (2006.01)
G09G 3/18 (2006.01)
G09G 5/00 (2006.01)
G06F 3/038 (2013.01)
H01L 29/04 (2006.01)
H01L 29/10 (2006.01)
H01L 31/00 (2006.01)
H01L 27/14 (2006.01)
H01L 29/15 (2006.01)
H01L 31/036 (2006.01)

(52) U.S. Cl.
USPC ............... 349/39; 349/37; 349/38; 349/139; 349/144; 349/192; 345/54; 345/96; 345/209; 257/59; 257/72

(58) Field of Classification Search
USPC .......... 349/37–39, 139, 144, 192; 345/54, 96, 345/209; 257/59, 72
See application file for complete search history.

(56) References Cited

U.S. PATENT DOCUMENTS

| 6,552,706 | B1* | 4/2003 | Ikeda et al. ................ 345/96 |
| 7,068,330 | B2* | 6/2006 | Song et al. ................ 349/39 |
| 7,417,693 | B2 | 8/2008 | Kawasaki |
| 7,746,416 | B2* | 6/2010 | Wu ................ 349/38 |
| 2007/0002193 | A1 | 1/2007 | Kim et al. |

FOREIGN PATENT DOCUMENTS

| TW | 200832328 | 8/2008 |
| TW | 200839691 | 10/2008 |
| TW | 200842790 | 11/2008 |

OTHER PUBLICATIONS

Notice of Allowance mailed on Jul. 8, 2013 for the Taiwan application No. 099125134, filding date Jul. 29, 2010.

* cited by examiner

*Primary Examiner* — Lucy Chien
*Assistant Examiner* — Paisley L Arendt
(74) *Attorney, Agent, or Firm* — Winston Hsu; Scott Margo

(57) ABSTRACT

A pixel structure includes a plurality of data lines and a common line. The common line overlaps each data line, and is coupled with each data line to respectively form a first coupling capacitor, a second coupling capacitor, a third coupling capacitor, a fourth coupling capacitor, a fifth coupling capacitor, and a sixth coupling capacitor. The third coupling capacitor is smaller than the second coupling capacitor, and the fifth coupling capacitor is smaller than the fourth coupling capacitor.

38 Claims, 20 Drawing Sheets

LIQUID CRYSTAL DISPLAY PANEL, PIXEL ARRAY SUBSTRATE AND PIXEL STRUCTURE THEREOF FOR SOLVING GREENISH PROBLEM

BACKGROUND OF THE INVENTION

1. Field of the Invention

The present invention relates to a liquid crystal display panel, a pixel array substrate and a pixel structure thereof.

2. Description of the Prior Art

Generally speaking, a liquid crystal display panel has advantages of light weight, low power consumption, and low radiation; therefore, the liquid crystal display panel has been widely applied to many kinds of portable electronic products in the market, such as notebooks and personal digital assistants (PDA). When the liquid crystal display panel is driven, if liquid crystal molecules are fixed at an angle for a long time, the liquid crystal molecules may have the permanent deformation, so that frames displayed by the liquid crystal display panel cannot be changed. For this reason, a polarity inversion driving method is used to prevent from lowering the display quality of the liquid crystal display panel.

The polarity inversion driving method usually is divided into a frame inversion, a row inversion, a column inversion and a dot inversion. Please refer to FIG. 1. FIG. 1 illustrates a schematic diagram of a polarity arrangement of sub-pixels with white vertical-striped pattern displayed by the liquid crystal display panel utilizing the dot inversion driving method according to the prior art. As shown in FIG. 1, the liquid crystal display panel 10 of the prior art has a plurality of sub-pixels 12 arranged as a matrix. The sub-pixels 12 in each column respectively display red, green, and blue sequentially, and furthermore, a red sub-pixel (12R), a green sub-pixel (12G) adjacent to the red sub-pixel, and a blue sub-pixel (12B) adjacent to the green sub-pixel constitute a pixel 18. When the liquid crystal display panel 10 is driven by the dot inversion driving method, the polarity arrangement of the sub-pixels 12 in a same row has a positive polarity 14 and a negative polarity 16 arranged alternatively in sequence, and so does the polarity arrangement of the sub-pixels 12 in a same column.

Moreover, when the liquid crystal display panel 10 is tested by displaying the white vertical-striped pattern, the pixels in the same row alternatively display bright and dark in sequence, and the pixels in the same column display bright or dark. In the dot inversion driving method, the red sub-pixels (12R) and the blue sub-pixels (12B) that are turned on and disposed in the first row have the positive polarity 14 and the green sub-pixels (12G) that are turned on and disposed in the first row have the negative polarity 16. The polarity of each sub-pixel 12 is determined by comparing a pixel voltage of each sub-pixel with a common voltage. This means that when the pixel voltage is higher than the common voltage, the polarity of the sub-pixel 12 is the positive polarity, and the pixel electrode is at a high level. On the contrary, when the pixel voltage is lower than the common voltage, the pixel electrode is at a low level and the polarity of the sub-pixel 12 is the negative polarity.

Please refer to FIG. 2. FIG. 2 illustrates a timing of a pixel voltage of the red sub-pixel/blue sub-pixel and a pixel voltage of the green sub-pixel in the first row of FIG. 1. As shown in FIG. 1 and FIG. 2, in the same row, when the number of sub-pixels 12 having the positive polarity 14 is more than the number of sub-pixels 12 having the negative polarity 16, i.e. the data signal Vd provided to the red sub-pixel (12R) and the blue sub-pixel (12B) is at the high-level, and the data signal Vd provided to the green sub-pixel (12G) is at the low-level, the common voltage Vcom is easily affected by the data signal Vd provided to the red sub-pixel (12R) and the blue sub-pixel (12B) to shift toward the high-level. For this reason, the voltage difference for driving the red sub-pixel (12R)/the blue sub-pixel (12B) is reduced, and the voltage difference for driving the green sub-pixel (12G) is increased. Furthermore, the gray scale displayed by the red sub-pixel (12R)/the blue sub-pixel (12B) is lower than the gray scale displayed by the green sub-pixel (12G). Therefore, when the liquid crystal display panel 10 of the prior art is driven by the dot inversion driving method to test the white vertical-striped pattern, the liquid crystal display panel 10 displays greenish frames. Thus, to solve the problem of greenish frame is an objective in industry.

SUMMARY OF THE INVENTION

It is therefore one of the objectives of the present invention to provide a liquid crystal display panel, a pixel array substrate and a pixel structure thereof to solve the problem of greenish frame.

According to an embodiment of the present invention, the present invention provides a pixel structure disposed on a substrate, and the substrate has a first sub-pixel region, a second sub-pixel region and a third sub-pixel region. The pixel structure includes a plurality of data lines, a scan line, a first upper sub-pixel, a second upper sub-pixel, a third upper sub-pixel, a first lower sub-pixel, a second lower sub-pixel, a third lower sub-pixel, a first common line, and a second common line. The data lines include a first data line, a second data line, a third data line, a fourth data line, a fifth data line and a sixth data line. The first data line is disposed at a side of the first sub-pixel region, the second data line and the third data line are disposed between the first sub-pixel region and the second sub-pixel region, the fourth data line and the fifth data line are disposed between the second sub-pixel region and the third sub-pixel region, and the sixth data line is disposed at a side of the third sub-pixel region. The scan line crosses the data lines, and passes through the first sub-pixel region, the second sub-pixel region and the third sub-pixel region. The first upper sub-pixel, the second upper sub-pixel and the third upper sub-pixel are disposed at an upper side of the scan line in the first sub-pixel region, the second sub-pixel region and the third sub-pixel region respectively. Furthermore, the first upper sub-pixel, the second upper sub-pixel and the third upper sub-pixel are electrically connected to the scan line, the first upper sub-pixel is electrically connected to the first data line, the second upper sub-pixel is electrically connected to the fourth data line and the third upper sub-pixel is electrically connected to the fifth data line. The first lower sub-pixel, the second lower sub-pixel and the third lower sub-pixel are disposed at a lower side of the scan line in the first sub-pixel region, the second sub-pixel region and the third sub-pixel region respectively. Furthermore, the first lower sub-pixel, the second lower sub-pixel and the third lower sub-pixel are electrically connected to the scan line, the first lower sub-pixel is electrically connected to the second data line, the second lower sub-pixel is electrically connected to the third data line, and the third lower sub-pixel is electrically connected to the sixth data line. The first common line passes through the first upper sub-pixel, the second upper sub-pixel and the third upper sub-pixel, and partially overlaps the data lines. A first upper coupling capacitor is formed between the first common line and the first data line, a second upper coupling capacitor is formed between the first common line and the second data line, a third upper coupling capacitor is formed between the first common line and the third data line, a fourth upper coupling capacitor is formed between the first common line and the fourth data line, a fifth upper coupling capacitor is formed between the first common line and the fifth data line, and a sixth upper coupling capacitor is formed between the first common line and the sixth data line. In which the third upper coupling capacitor may be smaller than the second upper coupling capacitor, and the fifth upper coupling capacitor may be smaller than the fourth upper coupling capacitor. And the second common line passes through the first lower sub-pixel, the second lower sub-pixel and the third lower sub-pixel, and partially overlaps the data lines.

According to an embodiment of the present invention, the present invention provides a pixel array substrate. The pixel array substrate includes a substrate, a plurality of first pixel structures and a plurality of second pixel structures. A plurality of first pixel regions and a plurality of second pixel regions are defined on the substrate. The first pixel regions and the second pixel regions are arranged as a matrix, in other words, in the same row or in the same column, each first pixel region and each second pixel region are arranged alternatively in sequence. And each of each first pixel region and each second pixel region respectively has a first sub-pixel region, a second sub-pixel region and a third sub-pixel region defined therein. The first pixel structures and the second pixel structures are disposed on the substrate, each first pixel structure is disposed respectively in each first pixel region, and each second pixel structure is disposed respectively in each second pixel region. Each of each first pixel structure and each second pixel structure respectively includes a plurality of data lines, a scan line, a first upper sub-pixel, a second upper sub-pixel, a third upper sub-pixel, a first lower sub-pixel, a second lower sub-pixel, a third lower sub-pixel, a first common line, and a second common line. The data lines include a first data line, a second data line, a third data line, a fourth data line, a fifth data line and a sixth data line. The first data line is disposed at a side of the first sub-pixel region, the second data line and the third data line are disposed between the first sub-pixel region and the second sub-pixel region, the fourth data line and the fifth data line are disposed between the second sub-pixel region and the third sub-pixel region, and the sixth data line is disposed at a side of the third sub-pixel region. The scan line crosses the data lines, and passes through the first sub-pixel region, the second sub-pixel region and the third sub-pixel region. The first upper sub-pixel, the second upper sub-pixel and the third upper sub-pixel are disposed at an upper side of the scan line in the first sub-pixel region, the second sub-pixel region and the third sub-pixel region respectively. Furthermore, the first upper sub-pixel, the second upper sub-pixel and the third upper sub-pixel are electrically connected to the scan line. In each first pixel structure, the first upper sub-pixel is electrically connected to the first data line, the second upper sub-pixel is electrically connected to the fourth data line and the third upper sub-pixel is electrically connected to the fifth data line. In each second pixel structure, the first upper sub-pixel is electrically connected to the second data line, the second upper sub-pixel is electrically connected to the third data line and the third upper sub-pixel is electrically connected to the sixth data line. The first lower sub-pixel, the second lower sub-pixel and the third lower sub-pixel are disposed at a lower side of the scan line in the first sub-pixel region, the second sub-pixel region and the third sub-pixel region respectively. Furthermore, the first lower sub-pixel, the second lower sub-pixel and the third lower sub-pixel are electrically connected to the scan line. In each first pixel structure, the first lower sub-pixel is electrically connected to the second data line, the second lower sub-pixel is electrically connected to the third data line, and the third lower sub-pixel is electrically connected to the sixth data line. In each second pixel structure, the first lower sub-pixel is electrically connected to the first data line, the second lower sub-pixel is electrically connected to the fourth data line, and the third lower sub-pixel is electrically connected to the fifth data line. The first common line passes through the first upper sub-pixel, the second upper sub-pixel and the third upper sub-pixel, and partially overlaps the data lines. A first upper coupling capacitor is formed between the first common line and the first data line, a second upper coupling capacitor is formed between the first common line and the second data line, a third upper coupling capacitor is formed between the first common line and the third data line, a fourth upper coupling capacitor is formed between the first common line and the fourth data line, a fifth upper coupling capacitor is formed between the first common line and the fifth data line, and a sixth upper coupling capacitor is formed between the first common line and the sixth data line. In each first pixel structure, the third upper coupling capacitor may be smaller than the second upper coupling capacitor, and the fifth upper coupling capacitor may be smaller than the fourth upper coupling capacitor. And the second common line passes through the first lower sub-pixel, the second lower sub-pixel and the third lower sub-pixel, and partially overlaps the data lines.

According to an embodiment of the present invention, the present invention provides a liquid crystal display panel. The liquid crystal display panel includes a first substrate, a plurality of first pixel structures and a plurality of second pixel structures, a second substrate and a liquid crystal layer. A plurality of first pixel regions and a plurality of second pixel regions are defined on the first substrate. The first pixel regions and the second pixel regions are arranged as a matrix, in other words, in the same row or in the same column, each first pixel region and each second pixel region are arranged alternatively in sequence. And each of each first pixel region and each second pixel region respectively has a first sub-pixel region, a second sub-pixel region and a third sub-pixel region defined therein. The first pixel structures and the second pixel structures are disposed on the substrate, each first pixel structure is disposed respectively in each first pixel region, and each second pixel structure is disposed respectively in each second pixel region. Each of each first pixel structure and each second pixel structure respectively includes a plurality of data lines, a scan line, a first upper sub-pixel, a second upper sub-pixel, a third upper sub-pixel, a first lower sub-pixel, a second lower sub-pixel, a third lower sub-pixel, a first common line, and a second common line. The data lines include a first data line, a second data line, a third data line, a fourth data line, a fifth data line and a sixth data line. The first data line is disposed at a side of the first sub-pixel region, the second data line and the third data line are disposed between the first sub-pixel region and the second sub-pixel region, the fourth data line and the fifth data line are disposed between the second sub-pixel region and the third sub-pixel region, and the sixth data line is disposed at a side of the third sub-pixel region. The scan line crosses the data lines, and passes through the first sub-pixel region, the second sub-pixel region and the third sub-pixel region. The first upper sub-pixel, the second upper sub-pixel and the third upper sub-pixel are disposed at an upper side of the scan line in the first sub-pixel region, the second sub-pixel region and the third sub-pixel region respectively. Furthermore, the first upper sub-pixel, the second upper sub-pixel and the third upper sub-pixel are electrically connected to the scan line. In each first pixel structure, the first upper sub-pixel is electrically connected to the first data line, the second upper sub-pixel is electrically connected to the fourth data line and the third upper sub-pixel is electrically connected to the fifth data line. In each second pixel structure, the first upper sub-pixel is electrically connected to the second data line, the second upper sub-pixel is electrically connected to the third data line and the third upper sub-pixel is electrically connected to the sixth data line. The first lower sub-pixel, the second lower sub-pixel and the third lower sub-pixel are disposed at a lower side of the scan line in the first sub-pixel region, the second sub-pixel region and the third sub-pixel region respectively. Furthermore, the first lower sub-pixel, the second lower sub-pixel and the third lower sub-pixel are electrically connected to the scan line. In each first pixel structure, the first lower sub-pixel is electrically connected to the second data line, the second lower sub-pixel is electrically connected to the third data line, and the third lower sub-pixel is electrically connected to the sixth data line. In each second pixel structure, the first lower sub-pixel is electrically connected to the first data line, the second lower sub-pixel is electrically connected to the fourth data line, and the third lower sub-pixel is electrically connected to the fifth data line. The first common line passes through the first upper sub-pixel, the second upper sub-pixel and the third upper sub-pixel, and partially overlaps the data lines. A first upper coupling capacitor is formed between the first common line and the first data line, a second upper coupling capacitor is formed between the first common line and the second data line, a third upper coupling capacitor is formed between the first common line and the third data line, a fourth upper coupling capacitor is formed between the first common line and the fourth data line, a fifth upper coupling capacitor is formed between the first common line and the fifth data line, and a sixth upper coupling capacitor is formed between the first common line and the sixth data line. In each first pixel structure, the third upper coupling capacitor may be smaller than the second upper coupling capacitor, and the fifth upper coupling capacitor may be smaller than the fourth upper coupling capacitor. And the second common line passes through the first lower sub-pixel, the second lower sub-pixel and the third lower sub-pixel, and partially overlaps the data lines. The second substrate is disposed opposite to the first substrate, and the liquid crystal layer is disposed between the first substrate and the second substrate.

According to an embodiment of the present invention, the present invention provides another pixel structure disposed on a substrate, and the substrate has a first sub-pixel region, a second sub-pixel region and a third sub-pixel region. The pixel structure includes a plurality of odd data lines, a plurality of even data lines, a scan line, a first upper sub-pixel, a second upper sub-pixel, a third upper sub-pixel, a first lower sub-pixel, a second lower sub-pixel, a third lower sub-pixel, a first common line, and a second common line. The odd data lines include a first data line disposed at a side of the first sub-pixel region, a third data line disposed at a side of the second sub-pixel region, and a fifth data line disposed at a side of the third sub-pixel region. The even data lines include a second data line disposed at another side of the first sub-pixel region, a fourth data line disposed at another side of the second sub-pixel region, and a sixth data line disposed at another side of the third sub-pixel region. The scan line crosses the data lines, and passes through the first sub-pixel region, the second sub-pixel region and the third sub-pixel region. The first upper sub-pixel, the second upper sub-pixel and the third upper sub-pixel are disposed at an upper side of the scan line in the first sub-pixel region, the second sub-pixel region and the third sub-pixel region respectively. Furthermore, the first upper sub-pixel is electrically connected to the first data line, the second upper sub-pixel is electrically connected to the fourth data line and the third upper sub-pixel is electrically connected to the fifth data line. The first lower sub-pixel, the second lower sub-pixel and the third lower sub-pixel are disposed at a lower side of the scan line in the first sub-pixel region, the second sub-pixel region and the third sub-pixel region respectively. Furthermore, the first lower sub-pixel is electrically connected to the scan line and the second data line, the second lower sub-pixel is electrically connected to the scan line and the third data line, and the third lower sub-pixel is electrically connected to the scan line and the sixth data line. The first common line passes through the first upper sub-pixel, the second upper sub-pixel and the third upper sub-pixel, and partially overlaps the data lines. A first upper coupling capacitor is formed between the first common line and each odd data line, a second upper coupling capacitor is formed between the first common line and each even data line, and the first upper coupling capacitor is smaller than the second upper coupling capacitor. The second common line passes through the first lower sub-pixel, the second lower sub-pixel and the third lower sub-pixel, and partially overlaps the data lines.

In the pixel structure of the present invention, the first upper coupling capacitor electrically connected to the first upper sub-pixel and the fifth upper coupling capacitor electrically connected to the third upper sub-pixel are smaller than the fourth upper coupling capacitor electrically connected to the second upper sub-pixel, so that the influence of the second upper sub-pixel for displaying green on the common voltage is larger than the influences of the first upper sub-pixel for displaying red and the third upper sub-pixel for displaying blue on the common voltage. Therefore, when the polarities of the first upper sub-pixel and the third upper sub-pixel are different from the polarity of the second upper sub-pixel, the sub-pixels of the pixel structure may have identical pixel voltage by adjusting the first upper coupling capacitor, the fourth upper coupling capacitor and the fifth upper coupling capacitor to solve the problem of greenish frame of sub-pixels in the pixel structure.

These and other objectives of the present invention will no doubt become obvious to those of ordinary skill in the art after reading the following detailed description of the preferred embodiment that is illustrated in the various figures and drawings.

DETAILED DESCRIPTION

To provide a better understanding of the present invention, exemplary embodiments will be detailed as follows. The exemplary embodiments of the present invention are illustrated in the accompanying drawings with numbered elements to elaborate the contents and effects to be achieved.

Figure 1:
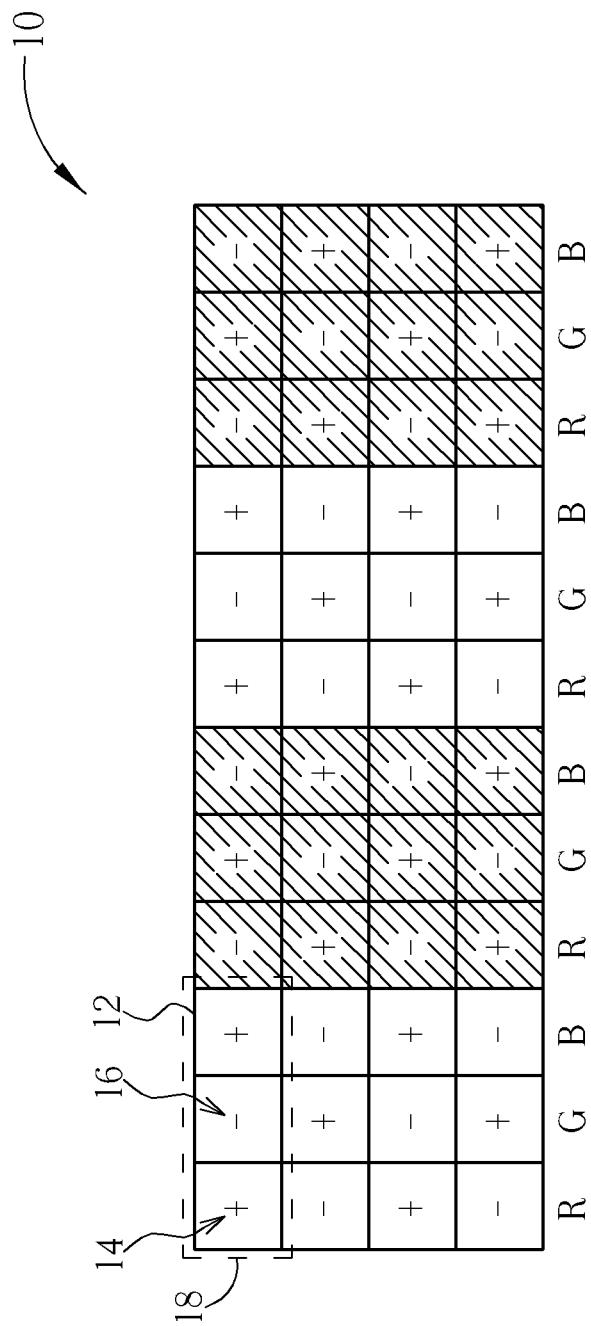
FIG. 1 illustrates a schematic diagram of a polarity arrangement of sub-pixels with white vertical-striped pattern displayed by the liquid crystal display panel utilizing the dot inversion driving method according to the prior art.
Figure 2:
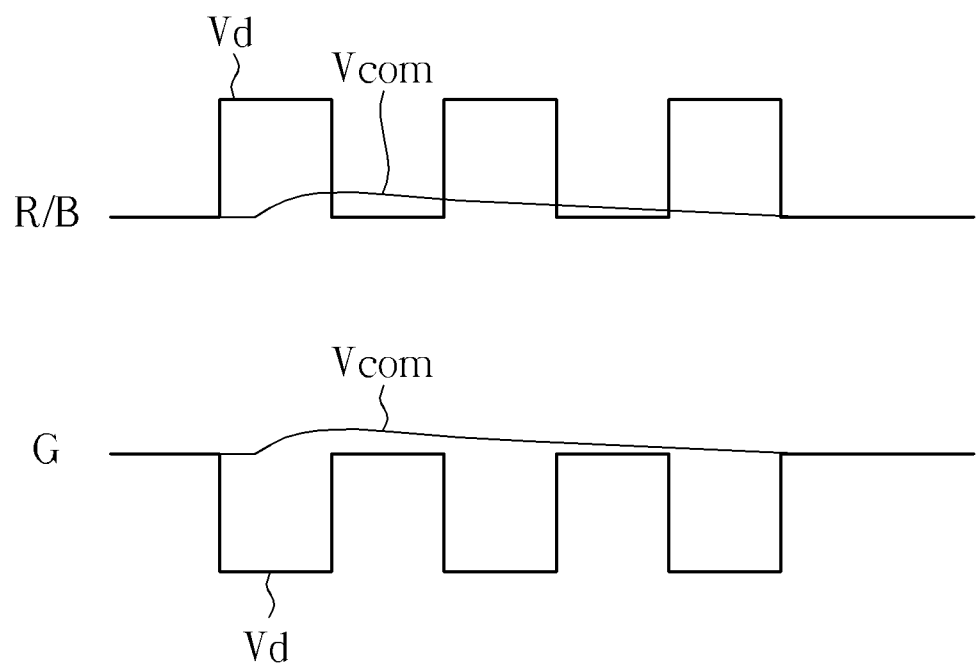
FIG. 2 illustrates a timing of a pixel voltage of the red sub-pixel/blue sub-pixel and a pixel voltage of the green sub-pixel in the first row of FIG. 1.
Figure 3:
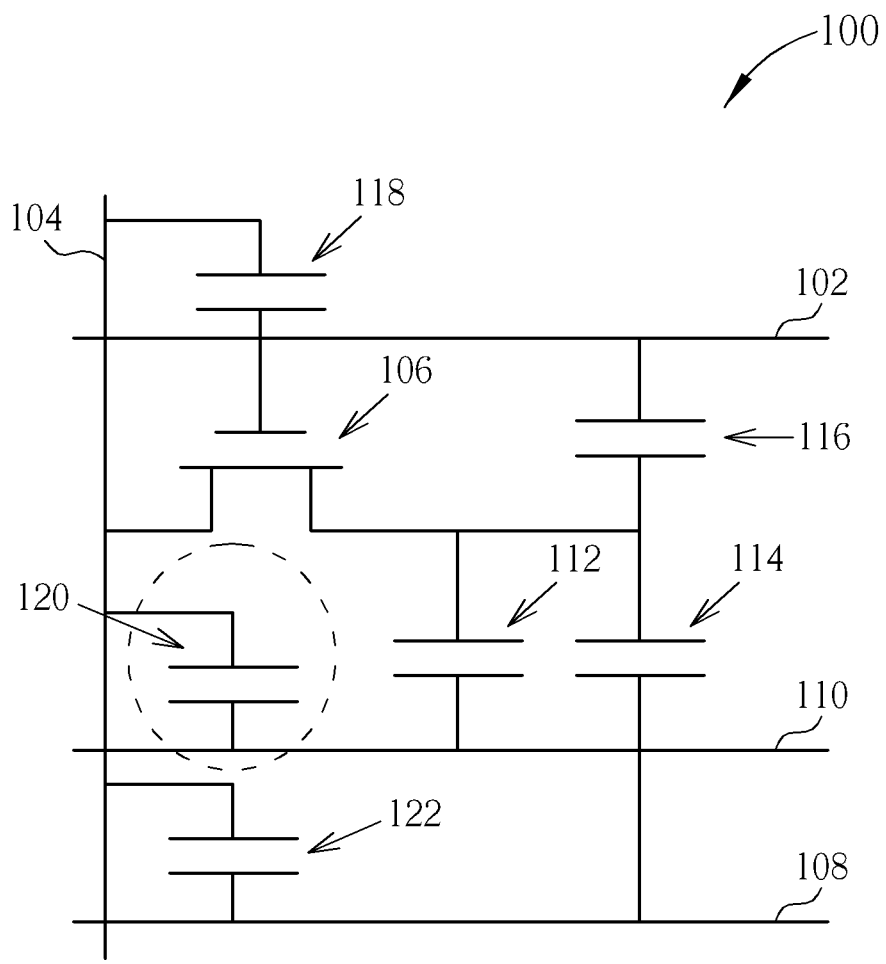
FIG. 3 illustrates a schematic diagram of an equivalent circuit of a sub-pixel according to the present invention.

Please refer to FIG. 3. FIG. 3 illustrates a schematic diagram of an equivalent circuit of a sub-pixel 100 according to the present invention. As shown in FIG. 3, the sub-pixel 100 of the present invention is electrically connected to a scan line 102 and a data line 104, and the sub-pixel 100 includes a transistor 106 and a pixel electrode (not shown in FIG. 3). The pixel electrode is electrically connected to the drain of the transistor 106, the data line 104 is electrically connected to the source of the transistor 106, and the scan line 102 is electrically connected to the gate of the transistor 106. The pixel electrode overlaps with a common electrode 108 and a common line 110, so that a storage capacitor 112 is coupled between the pixel electrode and the common line 110, and a liquid crystal capacitor 114 is coupled between the pixel electrode and the common electrode 108. The data line 104, the scan line 102, the common line 110 and the transistor 106 are disposed on a pixel array substrate, and the common electrode 108 is disposed on a color filter substrate. Moreover, a coupling capacitor 116 is coupled between the drain of the transistor 106 and the scan line 102, and a coupling capacitor 118 is coupled between the data line 104 and the scan line 102. A coupling capacitor 120 is coupled between the data line 104 and the common line 110 at the pixel array substrate, and a coupling capacitor 122 is coupled between the data line 104 and the common electrode 108 on the color filter substrate. As mentioned above, when the transistor 106 is turned on by receiving a scan signal, a data signal is provided to the pixel electrode through the transistor 106. At the same time, because of the coupling capacitor coupled between the data line 104 and the common electrode 108 or between the data line 104 and the common line 110, such as the coupling capacitor 120 between the data line 104 and the common line 110 at the pixel array substrate, the coupling capacitor 122 between the data line 104 and the common electrode 108 at the color filter substrate, the storage capacitor 112, and the liquid crystal capacitor 114, the voltage of the common electrode 108 and the voltage of the common line 110 are affected by the data signal to shift.

For solving the problem of the greenish frame due to the unbalanced polarity, the present invention electrically connects a red sub-pixel, a green sub-pixel and a blue sub-pixel in a pixel region respectively to the coupling capacitors 120 between different data lines 104 and the common line 110 by respectively adjusting each coupling capacitor 120 between the data line 104 and the common line 110 at the pixel array substrate, when the coupling capacitor 122 between the data line 104 and the common electrode 108 at the color filter substrate, the storage capacitor 112 and the liquid crystal capacitor 114 are not changed. Thus, the red sub-pixel, the green sub-pixel and the blue sub-pixel could have the same pixel voltage, and the problem of the greenish frame could be solved.

Figure 4:
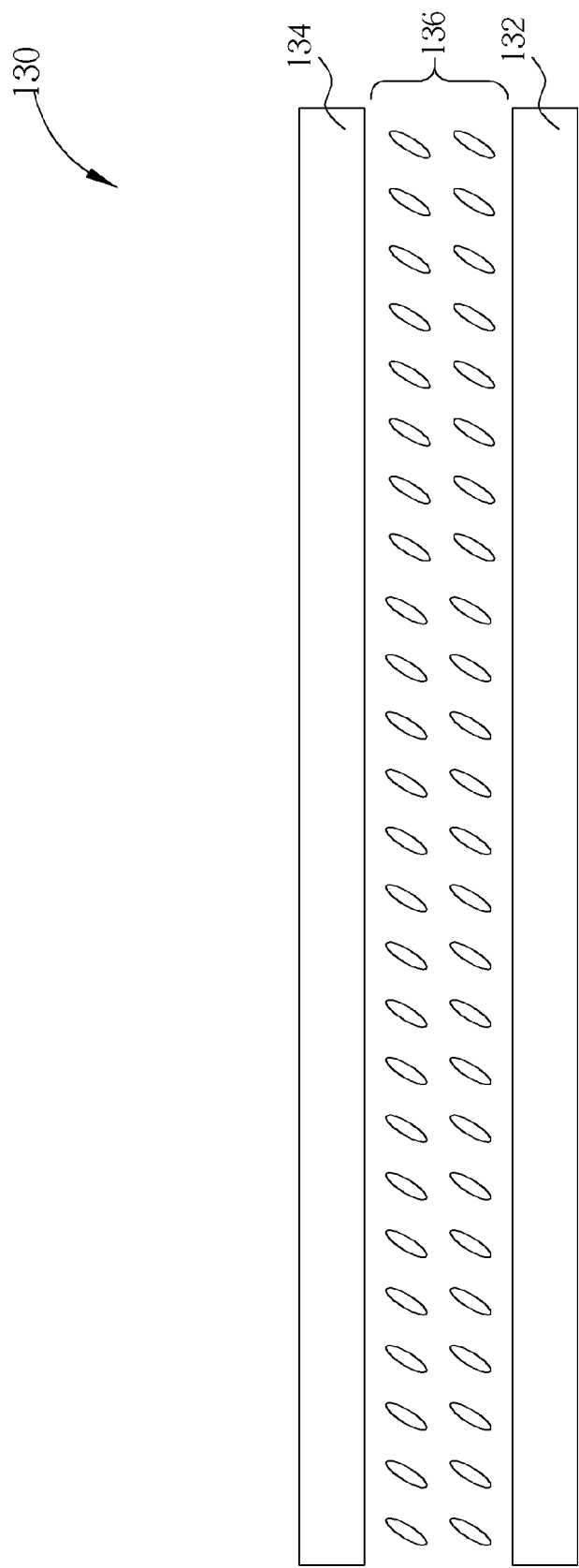
FIG. 4 illustrates a schematic diagram of a cross-sectional view of a liquid crystal display panel according to a first exemplary embodiment of the present invention.

Please refer to FIG. 4. FIG. 4 illustrates a schematic diagram of a cross-sectional view of a liquid crystal display panel 130 according to a first exemplary embodiment of the present invention. As shown in FIG. 4, the liquid crystal display panel 130 includes a first substrate, a second substrate and a liquid crystal layer, such as a pixel array substrate 132, a color filter substrate 134 and a liquid crystal layer 136. The pixel array substrate 132 is disposed opposite to the color filter substrate 134, and the liquid crystal layer 136 is disposed between the pixel array substrate 132 and the color filter substrate 134.

Figure 5:
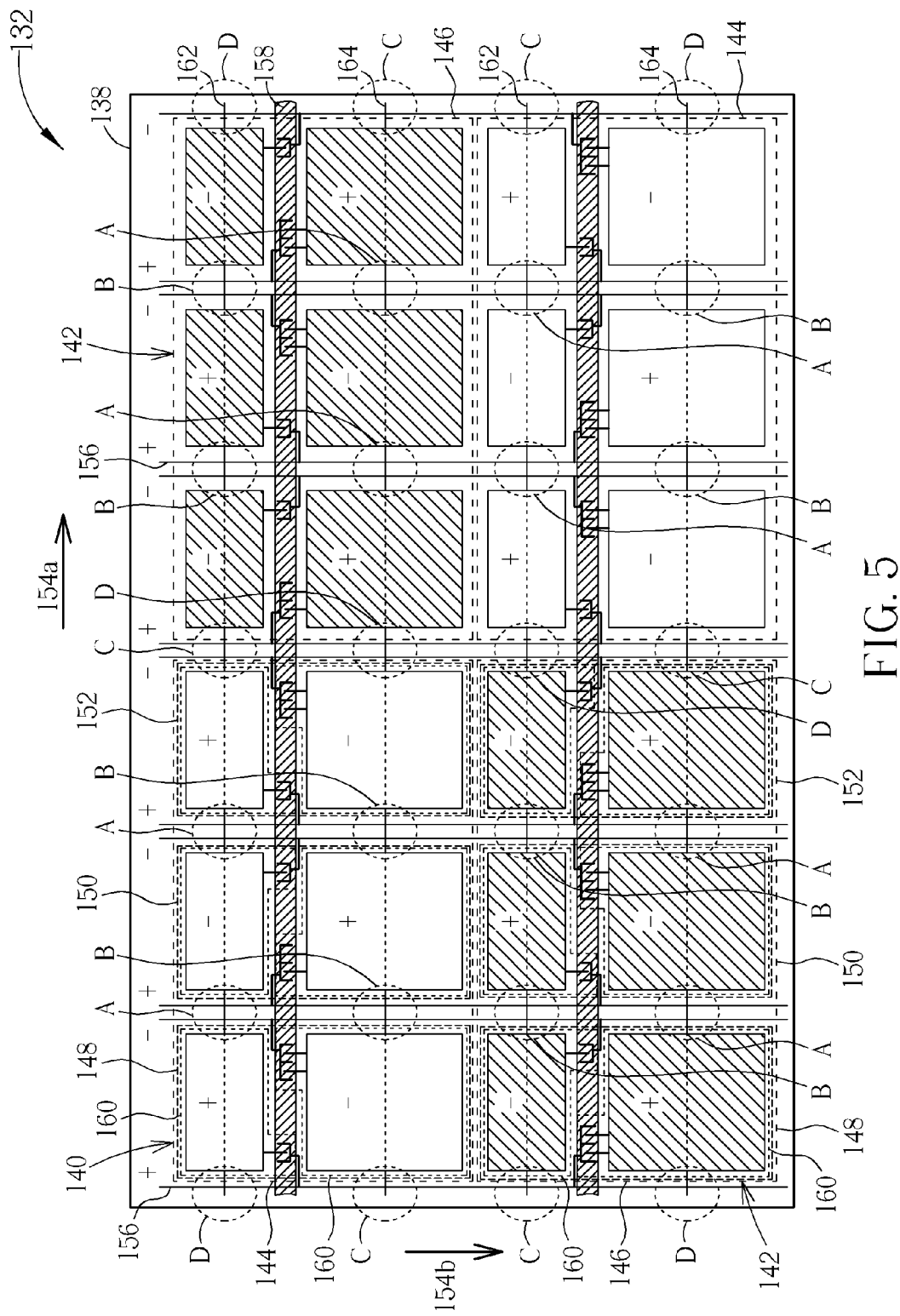
FIG. 5 illustrates a schematic diagram of a top view of a pixel array substrate according to a first exemplary embodiment of the present invention.

To detail the pixel array substrate 132 of this exemplary embodiment clearly, please refer to FIG. 5. FIG. 5 illustrates a schematic diagram of a top view of the pixel array substrate according to the first exemplary embodiment of the present invention. As shown in FIG. 5, the pixel array substrate 132 includes a substrate 138, a plurality of first pixel structures 140 and a plurality of second pixel structures 142. The substrate 138 has a plurality of first pixel regions 144 and a plurality of second pixel regions 146, and the first pixel regions 144 and the second pixel regions 146 are arranged as a matrix. In other words, in the same row or in the same column, each first pixel region 144 and each second pixel region 146 are disposed alternatively in sequence. Each of each first pixel region 144 and each second pixel region 146 has a first sub-pixel region 148, a second sub-pixel region 150 and a third sub-pixel region 152 respectively, and the first sub-pixel region 148, the second sub-pixel region 150 and the third sub-pixel region 152 are arranged sequentially along a first direction 154*a*. Each first pixel structure 140 is disposed on the substrate 138 in each first pixel region 144, and each second pixel structure 142 is disposed on the substrate 138 in each second pixel region 146. Each of each first pixel structure 140 and each second pixel structure 142 respectively includes a plurality of data lines 156, a scan line 158, a plurality of sub-pixels 160, a first common line 162 and a second common line 164. In this exemplary embodiment, the first sub-pixel region 148 includes a red sub-pixel region, the second sub-pixel region 150 includes a green sub-pixel region, and the third sub-pixel region 152 includes a blue sub-pixel region, but not limited thereto. The first sub-pixel region 148, the second sub-pixel region 150 or the third sub-pixel region 152 may be one of the red sub-pixel region, the green sub-pixel region, and the blue sub-pixel region, or a sub-pixel region with other different colors, as long as the combination of the first sub-pixel region 148, the second sub-pixel region 150 and the third sub-pixel region 152 could display white.

Figure 6:
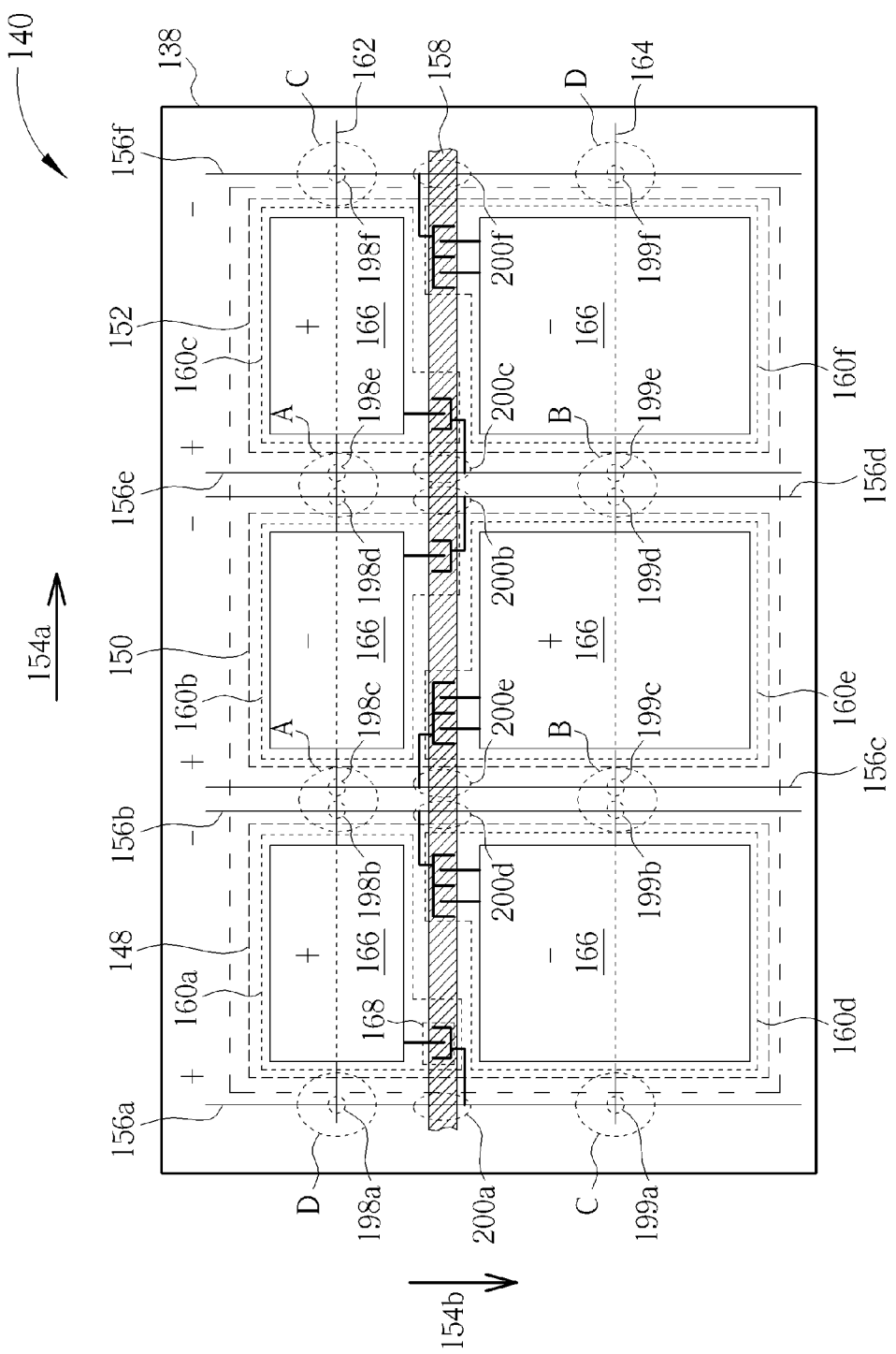
FIG. 6 illustrates a schematic diagram of a top view of a first pixel structure according to a first exemplary embodiment of the present invention.
Figure 7:
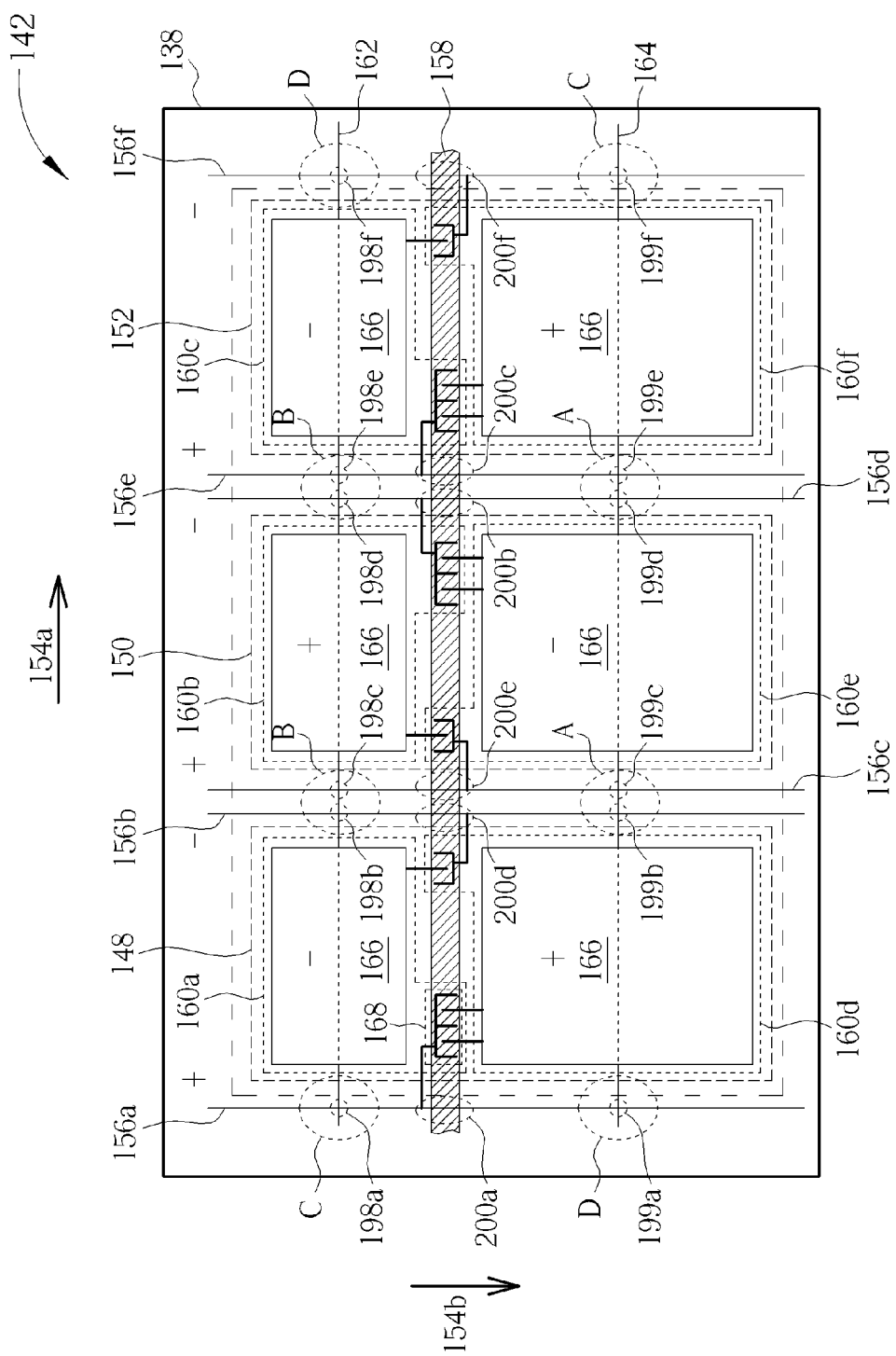
FIG. 7 illustrates a schematic diagram of a top view of a second pixel structure according to a first exemplary embodiment of the present invention.

Please refer to FIG. 6 and FIG. 7. FIG. 6 illustrates a schematic diagram of a top view of the first pixel structure 140 according to the first exemplary embodiment of the present invention. FIG. 7 illustrates a schematic diagram of a top view of the second pixel structure 142 according to the first exemplary embodiment of the present invention. As shown in FIG. 6 and FIG. 7, in the first pixel structure 140 and the second pixel structure 142, the sub-pixels 160 include a first upper sub-pixel 160*a*, a second upper sub-pixel 160*b*, a third upper sub-pixel 160*c*, a first lower sub-pixel 160*d*, a second lower sub-pixel 160*e*, and a third lower sub-pixel 160*f*, and each sub-pixel 160 further includes a sub-pixel electrode 166 and a transistor 168. The first upper sub-pixel 160*a* and the first lower sub-pixel 160*d* are disposed in the first sub-pixel region 148 for displaying red, the second upper sub-pixel 160*b* and the second lower sub-pixel 160*e* are disposed in the second sub-pixel region 150 for displaying green, and the third upper sub-pixel 160*c* and the third lower sub-pixel 160*f* are disposed in the third sub-pixel region 152 for displaying blue.

The scan line 158 is disposed on the substrate 138 along the first direction 154*a* and crosses the data lines 156. The scan line 158 passes through the first sub-pixel region 148, the second sub-pixel region 150 and the third sub-pixel region 152, and the first upper sub-pixel 160*a*, the second upper sub-pixel 160*b* and the third upper sub-pixel 160*c* are disposed at an upper side of the scan line 158 in the first sub-pixel region 148, the second sub-pixel region 150 and the third sub-pixel region 152 respectively. The first lower sub-pixel 160*d*, the second lower sub-pixel 160*e* and the third lower sub-pixel 160*f* are disposed at a lower side of the scan line 158 in the first sub-pixel region 148, the second sub-pixel region 150 and the third sub-pixel region 152 respectively. The scan line 158 is electrically connected to the gates of the transistors 168 of the first upper sub-pixel 160*a*, the second upper sub-pixel 160*b*, the third upper sub-pixel 160*c*, the first lower sub-pixel 160*d*, the second lower sub-pixel 160*e*, and the third lower sub-pixel 160*f*.

The data lines 156 are disposed on the substrate 138 along a second direction 154*b*, and the data lines 156 include a first data line 156*a*, a second data line 156*b*, a third data line 156*c*, a fourth data line 156*d*, a fifth data line 156*e*, and a sixth data line 156*f*. The first data line 156*a* is disposed at a side of the first sub-pixel region 148, and the second data line 156*b* and the third data line 156*c* are disposed between the first sub-pixel region 148 and the second sub-pixel region 150. The fourth data line 156*d* and the fifth data line 156*e* are disposed between the second sub-pixel region 150 and the third sub-pixel region 152, and the sixth data line 156*f* is disposed at a side of the third sub-pixel region 152.

Furthermore, the first common line 162 passes through the first upper sub-pixel 160*a*, the second upper sub-pixel 160*b* and the third upper sub-pixel 160*c*, and partially overlaps the data lines 156. Thus, a first upper coupling capacitor 198*a* is formed between the first common line 162 and the first data line 156*a*, and a second upper coupling capacitor 198*b* is formed between the first common line 162 and the second data line 156*b*. A third upper coupling capacitor 198*c* is formed between the first common line 162 and the third data line 156*c*, and a fourth upper coupling capacitor 198*d* is formed between the first common line 162 and the fourth data line 156*d*. A fifth upper coupling capacitor 198*e* is formed between the first common line 162 and the fifth data line 156*e*, and a sixth upper coupling capacitor 198*f* is formed between the first common line 162 and the sixth data line 156*f*. Moreover, the second common line 164 passes through the first lower sub-pixel 160*d*, the second lower sub-pixel 160*e* and the third lower sub-pixel 160*f*, and partially overlaps the data lines 156. Thus, a first lower coupling capacitor 199*a* is formed between the second common line 164 and the first data line 156*a*, and a second lower coupling capacitor 199*b* is formed between the second common line 164 and the second data line 156*b*. A third lower coupling capacitor 199*c* is formed between the second common line 164 and the third data line 156*c*, and a fourth lower coupling capacitor 199*d* is formed between the second common line 164 and the fourth data line 156*d*. A fifth lower coupling capacitor 199*e* is formed between the second common line 164 and the fifth data line 156*e*, and a sixth lower coupling capacitor 199*f* is formed between the second common line 164 and the sixth data line 156*f*.

In the first pixel structure 140, the drain of the transistor 168 of the first upper sub-pixel 160*a* is electrically connected to the first data line 156*a*, and the drain of the transistor 168 of the second upper sub-pixel 160*b* is electrically connected to the fourth data line 156*d*. The drain of the transistor 168 of the third upper sub-pixel 160*c* is electrically connected to the fifth data line 156*e*, and the drain of the transistor 168 of the first lower sub-pixel 160*d* is electrically connected to the second data line 156*b*. The drain of the transistor 168 of the second lower sub-pixel 160*e* is electrically connected to the third data line 156*c*, and the drain of the transistor 168 of the third lower sub-pixel 160*f* is electrically connected to the sixth data line 156*f*.

When the liquid crystal display panel starts displaying, each of the first data line 156*a*, the third data line 156*c* and the fifth data line 156*e* transfers a display signal with a third polarity, such as the positive polarity, to the corresponding sub-pixel 160 respectively, and each of the second data line 156*b*, the forth data line 156*d* and the sixth data line 156*f* transfers a display signal with a fourth polarity, such as the negative polarity, to the corresponding sub-pixel 160 respectively. The third polarity is contrary to the fourth polarity. Therefore, in the first pixel structure 140, the first upper sub-pixel 160*a*, the third upper sub-pixel 160*c* and the second lower sub-pixel 160*e* have a first polarity, such as the positive polarity, and the third polarity is the same as the first polarity.

The second upper sub-pixel 160b, the first lower sub-pixel 160d and the third lower sub-pixel 160f have a second polarity, such as the negative polarity, and the fourth polarity is the same as the second polarity. The first polarity is contrary to the second polarity.

In the second pixel structure 142, the first upper sub-pixel 160a is electrically connected to the second data line 156b, and the second upper sub-pixel 160b is electrically connected to the third data line 156c. The third upper sub-pixel 160c is electrically connected to the sixth data line 156f, and the first lower sub-pixel 160d is electrically connected to the first data line 156a. The second lower sub-pixel 160e is electrically connected to the fourth data line 156d, and the third lower sub-pixel 160f is electrically connected to the fifth data line 156e. When the liquid crystal display panel starts displaying, in the second pixel structures 142, the first upper sub-pixel 160a, the third upper sub-pixel 160c and the second lower sub-pixel 160e have the second polarity, and the second upper sub-pixel 160b, the first lower sub-pixel 160d and the third lower sub-pixel 160f have the first polarity.

It is appreciated that, in the first pixel structure 140 of this exemplary embodiment, the third upper coupling capacitor 198c is smaller than the second upper coupling capacitor 198b, and the fifth upper coupling capacitor 198e is smaller than the fourth upper coupling capacitor 198d. The third upper coupling capacitor 198c is the same as the fifth upper coupling capacitor 198e, and the second upper coupling capacitor 198b is the same as the fourth upper coupling capacitor 198d. Furthermore, the third lower coupling capacitor 199c is larger than the second lower coupling capacitor 199b, and the fifth lower coupling capacitor 199e is larger than the fourth lower coupling capacitor 199d. The third lower coupling capacitor 199c is the same as the fifth lower coupling capacitor 199e, and the second lower coupling capacitor 199b is the same as the fourth lower coupling capacitor 199d. Moreover, the first lower coupling capacitor 199a is larger than the first upper coupling capacitor 198a, and the sixth upper coupling capacitor 198f is larger than the sixth lower coupling capacitor 199f. The first lower coupling capacitor 199a is the same as the sixth upper coupling capacitor 198f, and the first upper coupling capacitor 198a is the same as the sixth lower coupling capacitor 199f.

Besides, in the second pixel structure 142 of this exemplary embodiment, the third upper coupling capacitor 198c is larger than the second upper coupling capacitor 198b, and the fifth upper coupling capacitor 198e is larger than the fourth upper coupling capacitor 198d. The third upper coupling capacitor 198c is the same as the fifth upper coupling capacitor 198e, the third lower coupling capacitor 199c of the first pixel structure 140 and the fifth lower coupling capacitor 199e of the first pixel structure 140, and the second upper coupling capacitor 198b is the same as the fourth upper coupling capacitor 198d, the second lower coupling capacitor 199b of the first pixel structure 140 and the fourth lower coupling capacitor 199d of the first pixel structure 140. Furthermore, the third lower coupling capacitor 199c is smaller than the second lower coupling capacitor 199b, and the fifth lower coupling capacitor 199e is smaller than the fourth lower coupling capacitor 199d. The third lower coupling capacitor 199c is the same as the fifth lower coupling capacitor 199e, the third upper coupling capacitor 198c of the first pixel structure 140 and the fifth upper coupling capacitor 198e of the first pixel structure 140, and the second lower coupling capacitor 199b is the same as the fourth lower coupling capacitor 199d, the second upper coupling capacitor 198b of the first pixel structure 140 and the fourth upper coupling capacitor 198d of the first pixel structure 140. Moreover, the first upper coupling capacitor 198a is larger than the first lower coupling capacitor 199a, and the sixth lower coupling capacitor 199f is larger than the sixth upper coupling capacitor 198f. The first upper coupling capacitor 198a is the same as the sixth lower coupling capacitor 199f and the first lower coupling capacitor 199a is the same as the sixth upper coupling capacitor 198f.

Accordingly, in the first pixel structure 140 of this exemplary embodiment, the first upper coupling capacitor 198a electrically connected to the first upper sub-pixel 160a, and the fifth upper coupling capacitor 198e electrically connected to the third upper sub-pixel 160c are smaller than the fourth upper coupling capacitor 198d electrically connected to the second upper sub-pixel 160b. Thus, the influence of the second upper sub-pixel 160b for displaying green on the common voltage is larger than the influences of the first upper sub-pixel 160a for displaying red and the third upper sub-pixel 160c for displaying blue on the common voltage. Therefore, when the polarities of the first upper sub-pixel 160a and the third upper sub-pixel 160c are different from the polarity of the second upper sub-pixel 160b, in this exemplary embodiment, the pixel voltages of the upper sub-pixels of the first pixel structures 140 could be the same by adjusting the first upper coupling capacitor 198a, the fourth upper coupling capacitor 198d and the fifth upper coupling capacitor 198e to solve the greenish problem of the upper sub-pixels in the first pixel structure 140. By the same way, the greenish problem of the lower sub-pixels in the first pixel structure 140 could be solved by adjusting the second lower coupling capacitor 199b, the third lower coupling capacitor 199c and the sixth lower coupling capacitor 199f. Furthermore, the greenish problem of the upper sub-pixels in the second pixel structure 142 could be solved by adjusting the second upper coupling capacitor 198b, the third upper coupling capacitor 198c and the sixth upper coupling capacitor 198f. And the greenish problem of the lower sub-pixels in the second pixel structure 142 could be solved by adjusting the first lower coupling capacitor 199a, the fourth lower coupling capacitor 199d and the fifth lower coupling capacitor 199e.

In addition, it is appreciated that, the first pixel structure 140 of this exemplary embodiment provides the first lower coupling capacitor 199a larger than the first upper coupling capacitor 198a to compensate the load change of the first data line 156a due to the decrease of the first upper coupling capacitor 198a, so that the abnormal display of the first upper sub-pixel 160a could be avoided. Similarly, the fourth upper coupling capacitor 198d could be compensated by the fourth lower coupling capacitor 199d, and the fifth upper coupling capacitor 198e could be compensated by the fifth lower coupling capacitor 199e, for preventing the abnormal displays of the second upper sub-pixel 160b and the third upper sub-pixel 160c. Additionally, the second lower coupling capacitor 199b, the third lower coupling capacitor 199c and the sixth lower coupling capacitor 199f could be compensated by the second upper coupling capacitor 198b, the third upper coupling capacitor 198c, and the sixth upper coupling capacitor 198f. In the second pixel structure 142 of this exemplary embodiment, the first lower coupling capacitor 199a, the fourth lower coupling capacitor 199d, the fifth lower coupling capacitor 199e, the second upper coupling capacitor 198b, the third upper coupling capacitor 198c and the sixth upper coupling capacitor 198f could be compensated by the first upper coupling capacitor 198a, the fourth upper coupling capacitor 198d, the fifth upper coupling capacitor 198e, the second lower coupling capacitor 199b, the third lower coupling capacitor 199c, and the sixth lower coupling capacitor 199f.

Figure 8:
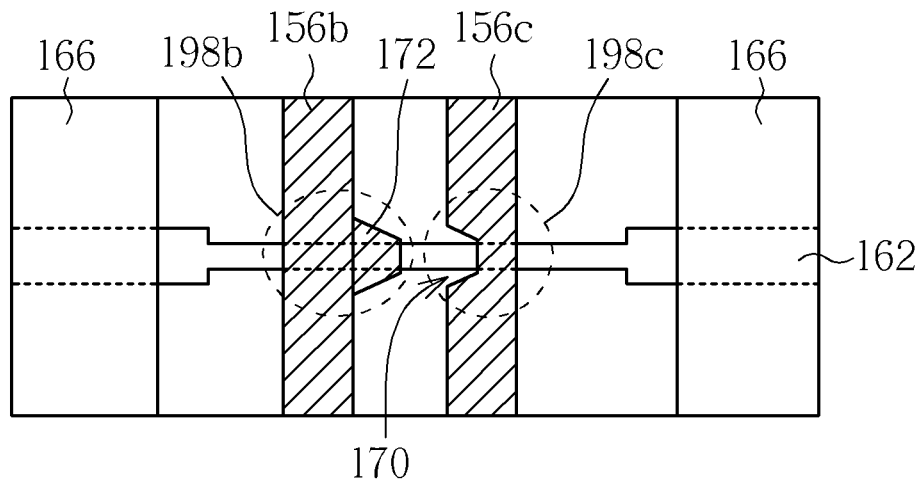
FIG. 8 illustrates a schematic diagram of an enlarged view in region A of FIG. 5.
Figure 9:
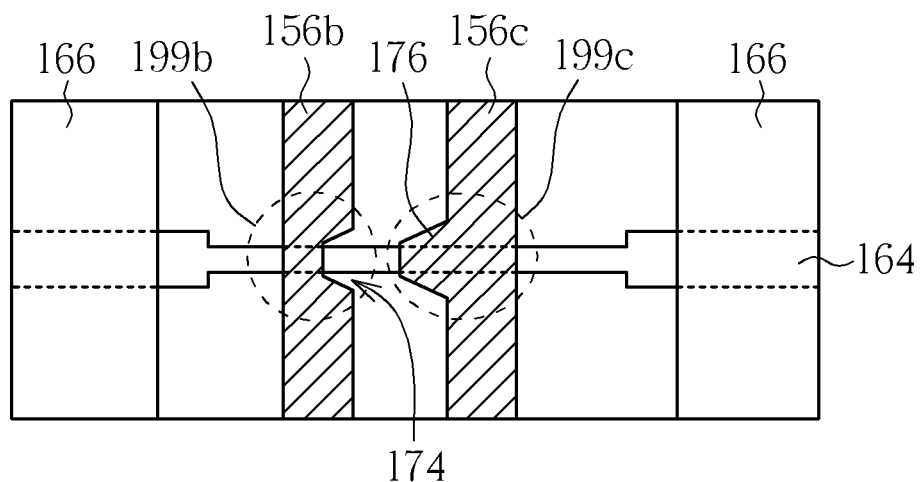
FIG. 9 illustrates a schematic diagram of an enlarged view in region B of FIG. 5.
Figure 10:
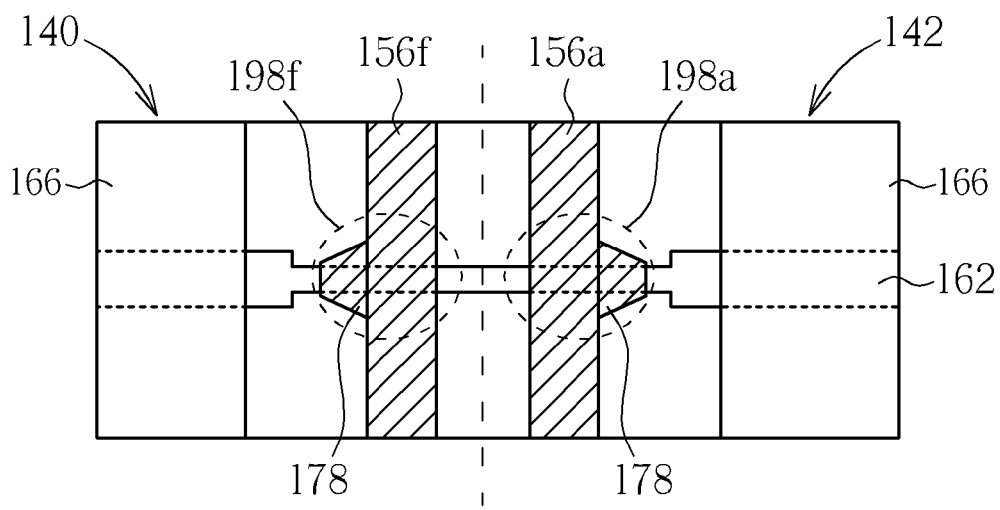
FIG. 10 illustrates a schematic diagram of an enlarged view in region C of FIG. 5.
Figure 11:
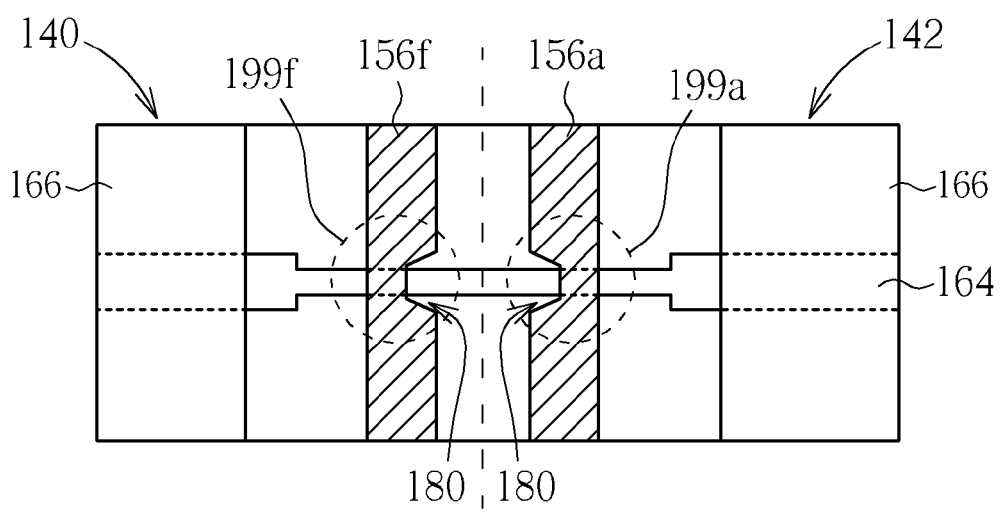
FIG. 11 illustrates a schematic diagram of an enlarged view in region D of FIG. 5.

To detail the structures of the coupling capacitors clearly, the structures of the coupling capacitors of this exemplary embodiment could be classified into four types and disposed in region A, region B, region C and region D respectively. Please refer to FIG. 8 through FIG. 11, and refer to FIG. 5 together. FIG. 8 illustrates a schematic diagram of an enlarged view in region A of FIG. 5, FIG. 9 illustrates a schematic diagram of an enlarged view in region B of FIG. 5, FIG. 10 illustrates a schematic diagram of an enlarged view in region C of FIG. 5, FIG. 11 illustrates a schematic diagram of an enlarged view in region D of FIG. 5. As shown in FIG. 5, in each first pixel structure 140, the second upper coupling capacitor 198b, the third upper coupling capacitor 198c, the fourth upper coupling capacitor 198d and the fifth upper coupling capacitor 198e are disposed in region A, and in each second pixel structure 142, the second lower coupling capacitor 199b, the third lower coupling capacitor 199c, the fourth lower coupling capacitor 199d, and the fifth lower coupling capacitor 199e are disposed in region A as well. Additionally, in each first pixel structure 140, the second lower coupling capacitor 199b, the third lower coupling capacitor 199c, the fourth lower coupling capacitor 199d and the fifth lower coupling capacitor 199e are disposed in region B, and in each second pixel structure 142, the second upper coupling capacitor 198b, the third upper coupling capacitor 198c, the fourth upper coupling capacitor 198d and the fifth upper coupling capacitor 198e are disposed in region B as well. The first lower coupling capacitor 199a of each first pixel structure 140 and the sixth lower coupling capacitor 199f of each second pixel structure 142 are disposed in region C, and so are the sixth upper coupling capacitor 198f of each first pixel structure 140 and the first upper coupling capacitor 198a of each second pixel structure 142. The first upper coupling capacitor 198a of each first pixel structure 140 and the sixth upper coupling capacitor 198f of each second pixel structure 142 are disposed in region D, and so are the sixth lower coupling capacitor 199f of each first pixel structure 140 and the first lower coupling capacitor 199a of each second pixel structure 142.

To detail the structure of the coupling capacitor in region A, the second upper coupling capacitor 198b and the third upper coupling capacitor 198c of the first pixel structure 140 are taken for example. As shown in FIG. 5 and FIG. 8, in the region A of the first pixel structure 140, the third upper coupling capacitor 198c includes a concave 170, and the concave 170 is disposed in the third data line 156c and used for adjusting an overlapping area between the first common line 162 and the third data line 156c to control the capacitance of the third upper coupling capacitor 198c. Furthermore, the second upper coupling capacitor 198b includes an extension 172, and the extension 172 is disposed in the second data line 156b and used for adjusting an overlapping area between the first common line 162 and the second data line 156b to control the capacitance of the second upper coupling capacitor 198b. Analogically, in region A, each of the fifth upper coupling capacitor 198e of the first pixel structure 140, the third lower coupling capacitor 199c of the second pixel structure 142 and the fifth lower coupling capacitor 199e of the second pixel structure 142 includes a concave 170 respectively, and the concaves 170 are disposed in the fifth data line 156e of the first pixel structure 140, the third data line 156c of the second pixel structure 142 and the fifth data line 156e of the second pixel structure 142 respectively and used for controlling the capacitances of the fifth upper coupling capacitor 198e of the first pixel structure 140, the third lower coupling capacitor 199c of the second pixel structure 142 and the fifth lower coupling capacitor 199e of the second pixel structure 142.

Figure 26:
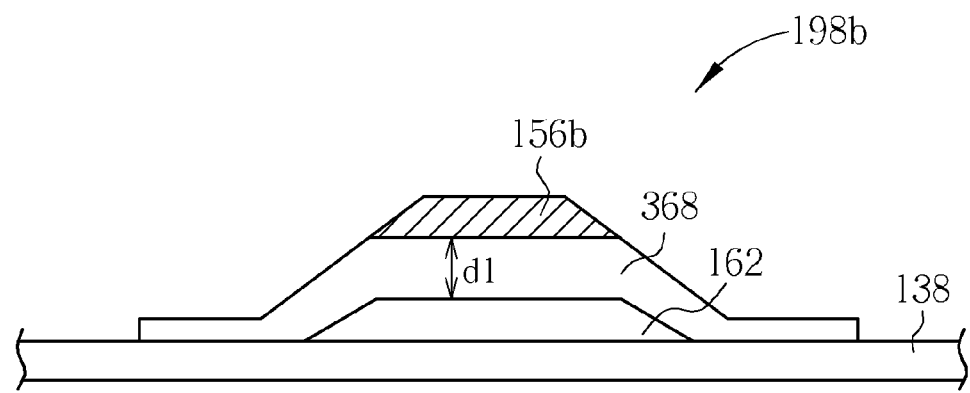
FIG. 26 illustrates a schematic diagram of a cross-sectional view of another exemplary embodiment of a second upper coupling capacitor in region A of FIG. 5.
Figure 27:
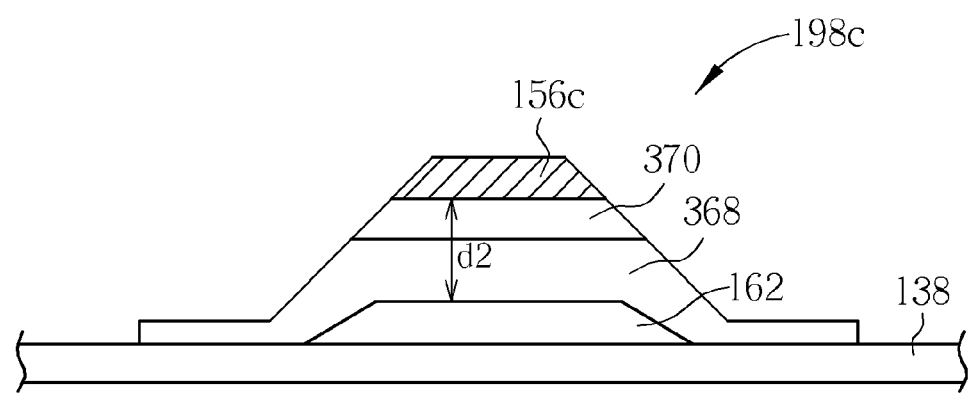
FIG. 27 illustrates a schematic diagram of a cross-sectional view of another exemplary embodiment of a third upper coupling capacitor in region A of FIG. 5.

The capacitance of the coupling capacitor of the present invention is not limited to be changed by adjusting an overlapping area between the common line and the data line. In other exemplary embodiments of the present invention, the capacitance of the coupling capacitor may also be controlled by adjusting the distance between the common line and the data line. The second upper coupling capacitor 198b and the third upper coupling capacitor 198c in region A are taken for examples. Please refer to FIG. 26 and FIG. 27. FIG. 26 illustrates a schematic diagram of a cross-sectional view of another exemplary embodiment of the second upper coupling capacitor 198b in region A of FIG. 5. FIG. 27 illustrates a schematic diagram of a cross-sectional view of another exemplary embodiment of the third upper coupling capacitor 198c in region A of FIG. 5. As shown in FIG. 26, the second upper coupling capacitor 198b is composed of the first common line 162, an insulating layer 368 and the second data line 156b, and the first common line 162 and the second data line 156b have a first distance d1 between there, that is the thickness of the insulating layer 368. Furthermore, as shown in FIG. 27, compared to the second upper coupling capacitor 198b, the third upper coupling capacitor 198c further includes a capacitor adjusting layer 370, disposed between the first common line 162 and the third data line 156c for controlling the capacitance of the third upper coupling capacitor 198c. In addition, the first common line 162 and the third data line 156c have a second distance d2 between there, and the second distance d2 is the same as the total thickness of the insulating layer 368 and the capacitor adjusting layer 370. In this exemplary embodiment, the thickness of the insulating layer 368 in the second upper coupling capacitor 198b is the same as the thickness of the insulating layer 368 in the third upper coupling capacitor 198c, so that the first distance d1 is less than the second distance d2, and the capacitance of the second upper coupling capacitor 198b is larger than the capacitance of the third upper coupling capacitor 198c. The capacitor adjusting layer 370 of this exemplary embodiment may be composed of non-silicon crystal material, and could be formed during forming the semiconductor layer of the transistor. For this reason, no extra step is required, but not limited thereto.

To detail the structure of the coupling capacitor in region B, the second lower coupling capacitor 199b and the third lower coupling capacitor 199c of the first pixel structure 140 are taken for example. As shown in FIG. 9, in region B of the first pixel structure 140, the second lower coupling capacitor 199b includes a concave 174, and the concave 174 is disposed in the second data line 156b and used for adjusting an overlapping area between the second common line 164 and the second data line 156b to control the capacitance of the second lower coupling capacitor 199b. Furthermore, the third lower coupling capacitor 199c includes an extension 176, and the extension 176 is disposed in the third data line 156c and used for adjusting an overlapping area between the second common line 164 and the third data line 156c to control the capacitance of the third lower coupling capacitor 199c. Analogically, in region B, each of the fourth lower coupling capacitor 199d of the first pixel structure 140, the second upper coupling capacitor 198b of the second pixel structure 142 and the fourth upper coupling capacitor 198d of the second pixel structure 142 includes a concave 174 respectively, and the concaves 174 are disposed in the fourth data line 156d of the first pixel structure 140, the second data line 156b of the second pixel structure 142 and the fourth data line 156d of the second pixel structure 142 respectively for controlling the capacitances of the fourth lower coupling capacitor 199d of the first pixel structure 140, the second upper coupling capacitor 198b of the second pixel structure 142 and the fourth upper coupling capacitor 198d of the second pixel structure 142.

To detail the structure of the coupling capacitor in region C, the sixth upper coupling capacitor 198f of the first pixel structure 140 and the first upper coupling capacitor 198a of the second pixel structure 142 are taken for example. As shown in FIG. 10, in region C, each of the sixth upper coupling capacitor 198f of the first pixel structure 140 and the first upper coupling capacitor 198a of the second pixel structure 142 includes an extension 178 respectively, and the extensions 178 are disposed in the sixth data line 156f of the first pixel structure 140 and the first data line 156a of the second pixel structure 142 and used for adjusting an overlapping area between the first common line 162 and the sixth data line 156f of the first pixel structure 140 and an overlapping area between the first common line 162 and the first data line 156a of the second pixel structure 142 to control the capacitances of the sixth upper coupling capacitor 198f of the first pixel structure 140 and the first upper coupling capacitor 198a of the second pixel structure 142. Analogically, in region C, each of the first lower coupling capacitor 199a of the first pixel structure 140 and the sixth lower coupling capacitor 199f of the second pixel structure 142 includes an extension 178 respectively, and the extensions 178 are disposed in the first data line 156a of the first pixel structure 140 and the sixth data line 156f of the second pixel structure 142 for controlling the capacitances of the first lower coupling capacitor 199a of the first pixel structure 140 and the sixth lower coupling capacitor 199f of the second pixel structure 142.

To detail the structure of the coupling capacitor in region D, the sixth lower coupling capacitor 199f of the first pixel structure 140 and the first lower coupling capacitor 199a of the second pixel structure 142 are taken for example. As shown in FIG. 11, in region D, each of the sixth lower coupling capacitor 199f of the first pixel structure 140 and the first lower coupling capacitor 199a of the second pixel structure 142 includes a concave 180 respectively, and the concaves 180 are disposed in the sixth data line 156f of the first pixel structure 140 and the first data line 156a of the second pixel structure 142 and used for adjusting an overlapping area between the second common line 164 and the sixth data line 156f of the first pixel structure 140 and an overlapping area between the second common line 164 and the first data line 156a of the second pixel structure 142 to control the capacitances of the sixth lower coupling capacitor 199f of the first pixel structure 140 and the first lower coupling capacitor 199a of the second pixel structure 142. Analogically, in region D, each of the first upper coupling capacitor 198a of the first pixel structure 140 and the sixth upper coupling capacitor 198f of the second pixel structure 142 includes a concave 180 respectively, and the concaves 180 are disposed in the first data line 156a of the first pixel structure 140 and the sixth data line 156f of the second pixel structure 142 for controlling the capacitances of the first upper coupling capacitor 198a of the first pixel structure 140 and the sixth upper coupling capacitor 198f of the second pixel structure 142.

In this exemplary embodiment, an area of each concave is the same as an area of each extension in each data line 156, so that the loads of the data lines 156 could be the same, and the first pixel structures 140 and the second pixel structures 142 could be operated normally. In other exemplary embodiments, the capacitance of the coupling capacitor in region B, region C and region D could be also changed by adjusting the distance between the common line and the data line 156.

Figure 12:
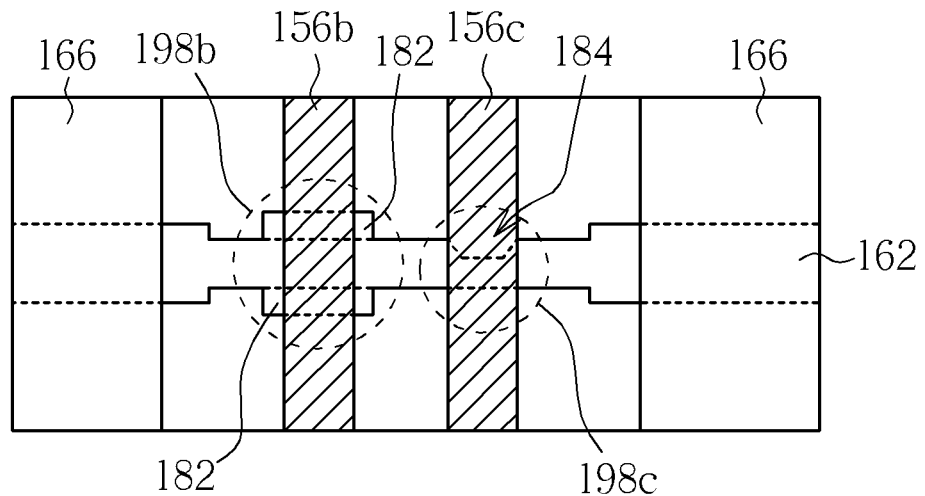
FIG. 12 illustrates a schematic diagram of another exemplary embodiment in region A of FIG. 5.
Figure 13:
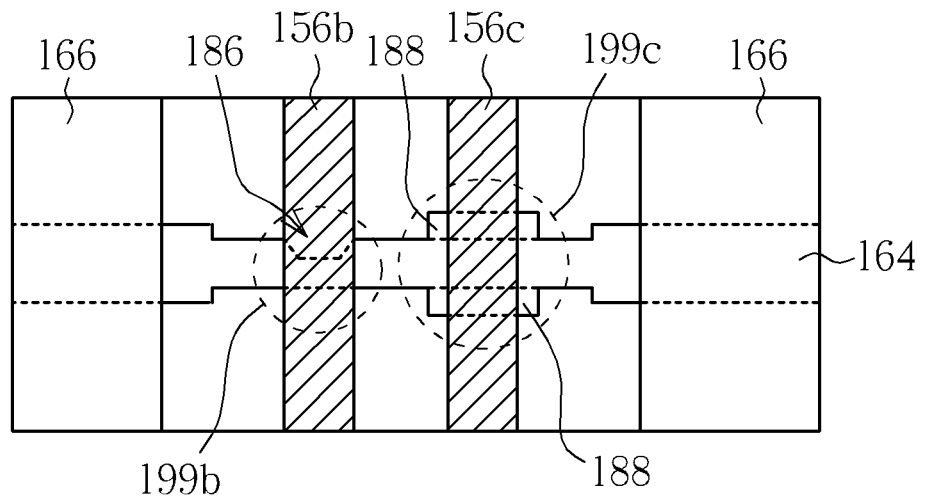
FIG. 13-FIG. 15 are other exemplary embodiments of region B, region C, and region D in FIG. 5.
Figure 14:
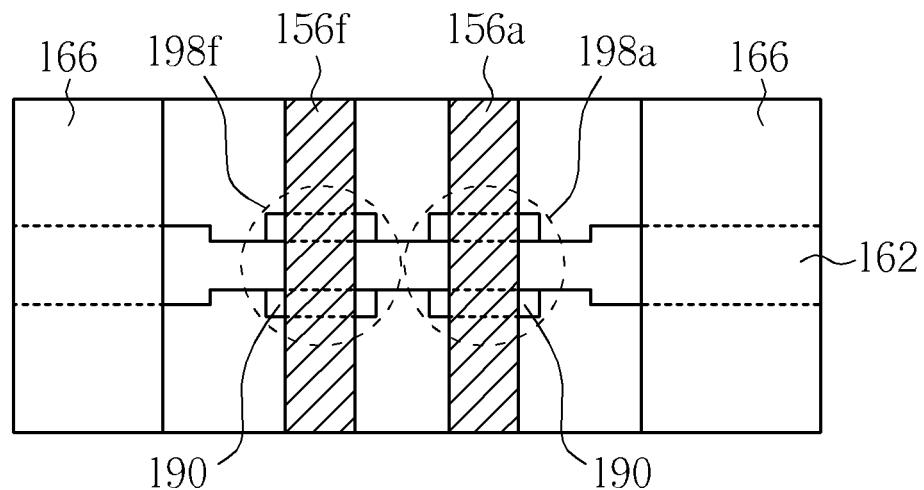
Figure 15:
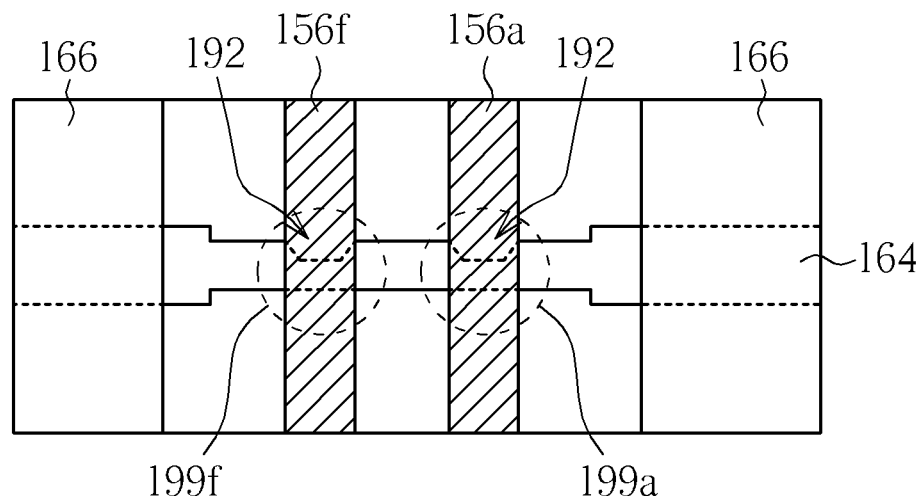

In addition, the capacitance of the coupling capacitor between the common line and each data line 156 of the present invention is not limited to be adjusted by changing the structure of each data line, and the overlapping area between each data line and the first common line and the overlapping area between each data line and the second common line of the present invention could be adjusted by changing the structure of the first common line and the second common line. The second upper coupling capacitor 198b and the third upper coupling capacitor 198c in region A of the first pixel structure 140 are taken for example in the following description. Please refer to FIG. 12, and FIG. 12 illustrates a schematic diagram of another exemplary embodiment in region A of FIG. 5. As shown in FIG. 12, the second upper coupling capacitor 198b includes at least an extension 182, and the extension 182 is disposed in the first common line 162 and used for adjusting the overlapping area between the first common line 162 and the second data line 156b to control the capacitance of the second upper coupling capacitor 198b. Moreover, the third upper coupling capacitor 198c includes a concave 184, and the concave 184 is disposed in the first common line 162 and used for adjusting the overlapping area between the first common line 162 and the third data line 156c, so that the capacitance of the second upper coupling capacitor 198b is larger than the capacitance of the third upper coupling capacitor 198c. The present invention is not limited to this, and the third upper coupling capacitor 198c of the present invention could also have no concave or extension. Similarly, in the first pixel structure 140, the extension 182 of the fourth upper coupling capacitor 198d and the concave 184 of the fifth upper coupling capacitor 198e may be disposed in the first common line 162. Furthermore, in the second pixel structure 142, the extensions 182 of the second lower coupling capacitor 199b and the fourth lower coupling capacitor 199d, and the concaves 184 of the third lower coupling capacitor 199c and the fifth lower coupling capacitor 199e may also be disposed in the second common line 164. Analogically, please refer to FIG. 13 through FIG. 15, and FIG. 13 through FIG. 15 are other exemplary embodiments of region B, region C, and region D in FIG. 5. As shown in FIG. 13, in region B of the first pixel structure 140, the concave 186 of the second lower coupling capacitor 199b and the fourth lower coupling capacitor 199d, and the extension 188 of the third lower coupling capacitor 199c and the fifth lower coupling capacitor 199e may be disposed in the second common line 164. Similarly, in region B of the second pixel structure 142, the concaves 186 of the second upper coupling capacitor 198b and the fourth upper coupling capacitor 198d and the extensions 188 of the third upper coupling capacitor 198c and the fifth upper coupling capacitor 198e may be disposed in the first common line 162. As shown in FIG. 14, in region C, the extension 190 of the sixth upper coupling capacitor 198f of the first pixel structure 140 and the extension 190 of the first upper coupling capacitor 198a of the second pixel structure 142 may be disposed in the first common line 162. Similarly, in region C, the extension 190 of the first lower coupling capacitor 199a of the first pixel structure 140 and the extension 190 of the sixth lower coupling capacitor 199f of the second pixel structure 142 may be disposed in the second common line 164. As shown in FIG. 15, in region D, the concave 192 of the sixth lower coupling capacitor 199f of the first pixel structure 140 and the concave 192 of the first lower coupling capacitor 199a of the second pixel structure 142 may be disposed in the second common line 164. Similarly, in region D, the concave 192 of the first upper coupling capacitor 198a of the first pixel structure 140 and the concave 192 of the sixth upper coupling capacitor 198f of the second pixel structure 142 may be disposed in the first common line 162.

Figure 16:
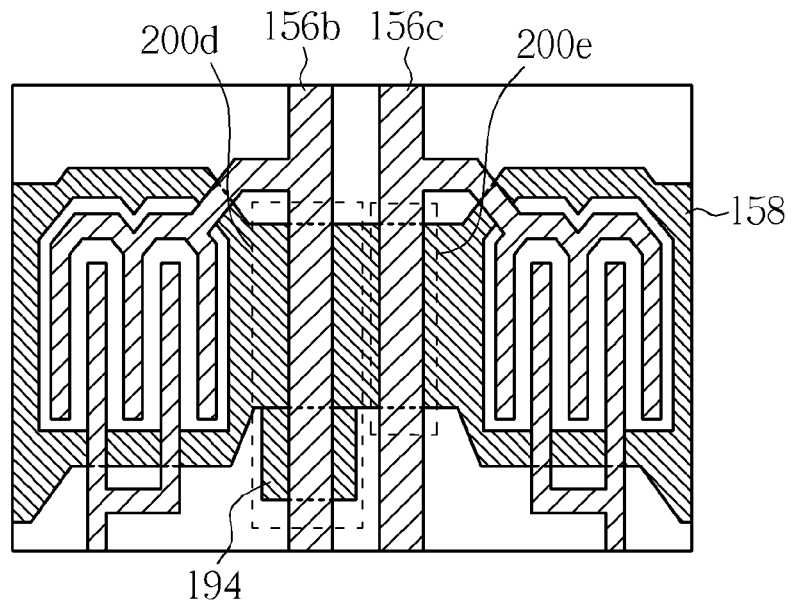
FIG. 16 illustrates a schematic diagram of an enlarged view of an overlapping region between data lines and a scan line according to a first exemplary embodiment according to the present invention.

However, the area of the concave may be different from the area of the extension due to the process deviation, so that the loads of the data lines may be different, and the liquid crystal display panel displays abnormally. In the present invention, an overlapping area between each data line 156 and the scan line 158 could be adjusted to compensate the loads of the data lines. For describing the compensation relation between the data lines 156 and the scan line 158 clearly, the second data line 156b and the third data line 156c of the first pixel substrate 140 are taken for example in the following description. Please refer to FIG. 16, and refer to FIG. 5 together. FIG. 16 illustrates a schematic diagram of an enlarged view of the overlapping region between the data lines 156 and the scan line 158 according to the first exemplary embodiment of the present invention. As shown in FIG. 5, in each first pixel structure 140 and each second pixel structure 142, a first adjusting capacitor 200a is formed between the scan line 158 and the first data line 156a, and a second adjusting capacitor 200b is formed between the scan line 158 and the fourth data line 156d. A third adjusting capacitor 200c is formed between the scan line 158 and the fifth data line 156e, and a fourth adjusting capacitor 200d is formed between the scan line 158 and the second data line 156b. A fifth adjusting capacitor 200e is formed between the scan line 158 and the third data line 156c, and a sixth adjusting capacitor 200f is formed between the scan line 158 and the sixth data line 156f. As shown in FIG. 16, in each first pixel structure 140, each of the fourth adjusting capacitor 200d and the sixth adjusting capacitor 200f includes an extension 194 respectively, and the extensions 194 are disposed in the scan line 158 and used for adjusting the overlapping area between the second data line 156b and the scan line 158 and the overlapping area between the sixth data line 156f and the scan line 158 to control the capacitances of the fourth adjusting capacitor 200d and the sixth adjusting capacitor 200f. The fifth adjusting capacitor 200e does not include an extension 194. Therefore, the fourth adjusting capacitor 200d electrically connected to the first lower sub-pixel 160d and the sixth adjusting capacitor 200f electrically connected to the third lower sub-pixel 160f are larger than the fifth adjusting capacitor 200e electrically connected to the second lower sub-pixel 160e to compensate a portion of the second lower coupling capacitor 199b electrically connected to the first lower sub-pixel 160d and the sixth lower coupling capacitor 199f electrically connected to the third lower sub-pixel 160f being smaller than the third lower coupling capacitor 199c electrically connected to the second lower sub-pixel 160e.

Similarly, each of the first adjusting capacitor 200a and the third adjusting capacitor 200c includes an extension 194 respectively, and the extensions 194 are disposed in the scan line 158 and used for adjusting the overlapping area between the first data line 156a and the scan line 158 and the overlapping area between the fifth data line 156e and the scan line 158 to control the capacitances of the first adjusting capacitor 200a and the third adjusting capacitor 200c. In this exemplary embodiment, the second adjusting capacitor 200b does not include the extension 194, so that the second adjusting capacitor 200b is smaller than the first adjusting capacitor 200a and the third adjusting capacitor 200c. Analogically, in each second pixel structure 142, each of the first adjusting capacitor 200a, the third adjusting capacitor 200c, the fourth adjusting capacitor 200d and the sixth adjusting capacitor 200f includes an extension 194 respectively, and the extensions 194 are disposed in the scan line 158. The second adjusting capacitor 200b and the fifth adjusting capacitor 200e do not include the extension 194. Therefore, the second adjusting capacitor 200b is smaller than the first adjusting capacitor 200a and the third adjusting capacitor 200c, and the fifth adjusting capacitor 200e is smaller than the fourth adjusting capacitor 200d and the sixth adjusting capacitor 200f.

Figure 17:
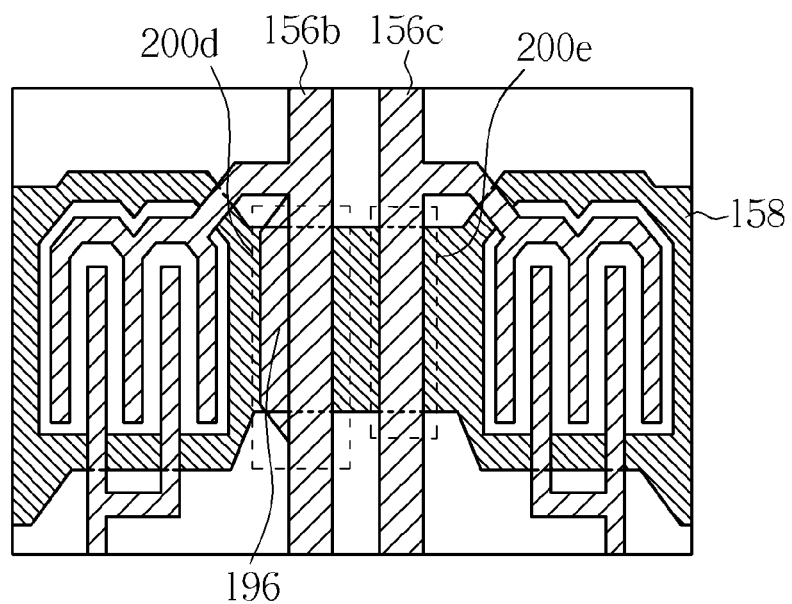
FIG. 17 illustrates a schematic diagram of another exemplary type of an overlapping region between data lines and a scan line in a first exemplary embodiment of the present invention.

The adjusting capacitor between each the data line 156 and the scan line 158 of the present invention is not limited to be adjusted by the extension of the scan line, and could be adjusted by an extension of each data line 156. Please refer to FIG. 17, and FIG. 17 illustrates a schematic diagram of another example of the overlapping area between the data lines 156 and the scan line 158 in the first exemplary embodiment according to the present invention. As shown in FIG. 17, in each first pixel structure 140 and each second pixel structure 142 of this exemplary embodiment, each of the first adjusting capacitor 200a, the third adjusting capacitor 200c, the fourth adjusting capacitor 200d and the sixth adjusting capacitor 200f includes an extension 196 respectively, and the extensions 196 are disposed on the first data line 156a, the fifth data line 156e, the second data line 156b, and the sixth data line 156f respectively. The second adjusting capacitor 200b and the fifth adjusting capacitor 200e do not include the extension 196. Therefore, the second adjusting capacitor 200b is smaller than the first adjusting capacitor 200a and the third adjusting capacitor 200c, and the fifth adjusting capacitor 200e is smaller than the fourth adjusting capacitor 200d and the sixth adjusting capacitor 200f.

Figure 18:
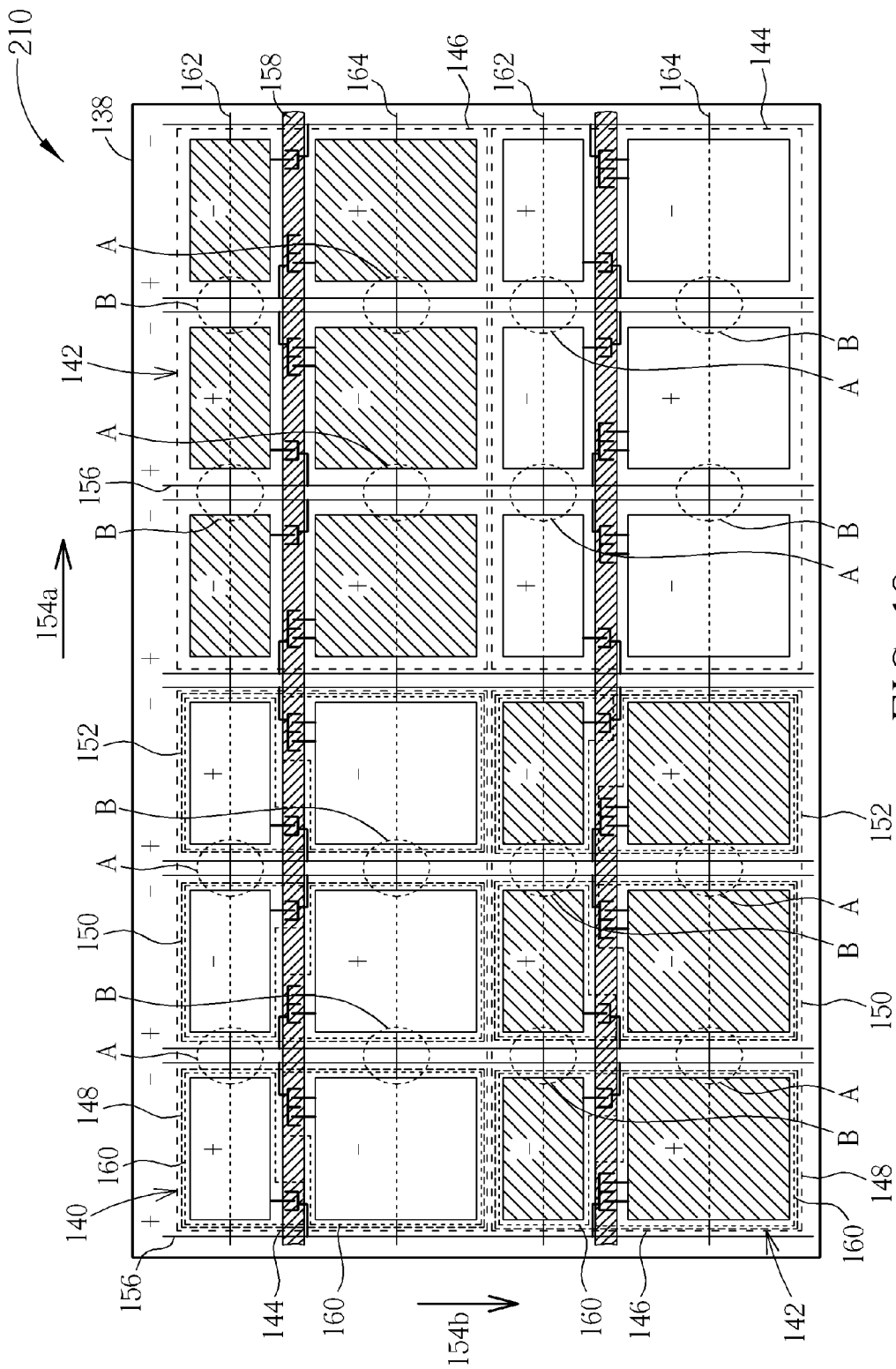
FIG. 18 illustrates a schematic diagram of a top view of a pixel array substrate according to a second exemplary embodiment of the present invention.
Figure 19:
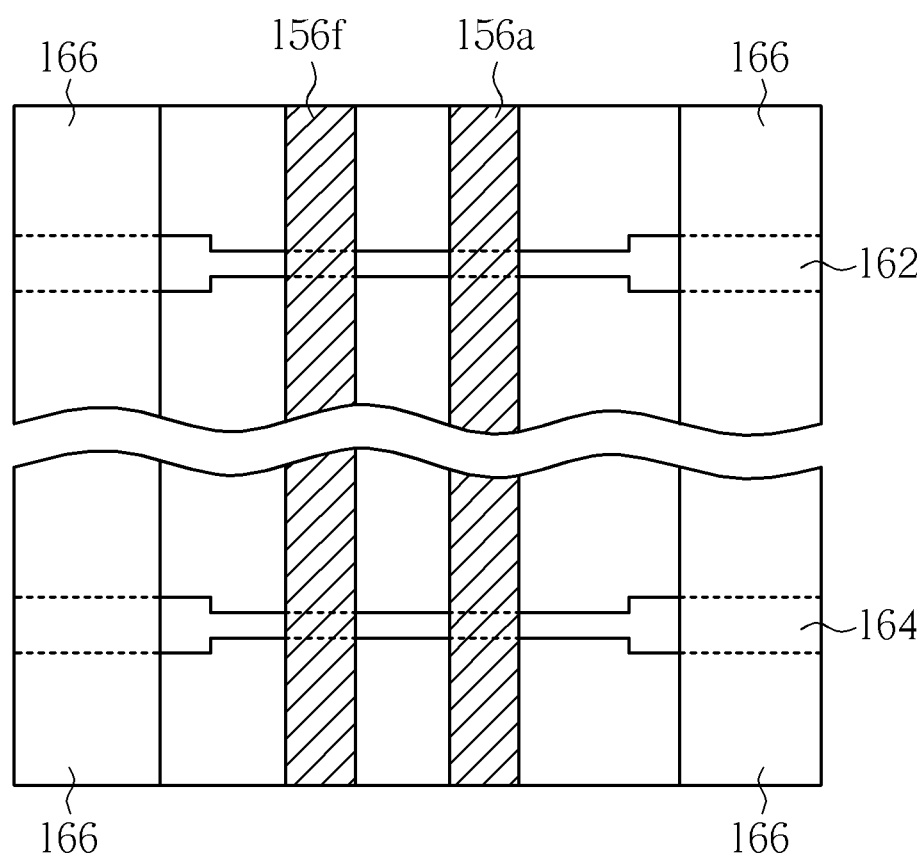
FIG. 19 illustrates a schematic diagram of an overlapping area between a first data line and a first common line, and between a sixth data line and a first common line according to a second exemplary embodiment of the present invention.

Please refer to FIG. 18 and FIG. 19. FIG. 18 illustrates a schematic diagram of a top view of a pixel array substrate 210 according to the second exemplary embodiment of the present invention. FIG. 19 illustrates a schematic diagram of an overlapping area between the first data line 156a and the first common line 162 and an overlapping area between the sixth data line 156f and the first common line 162 according to the second exemplary embodiment of the present invention. Same components are denoted by same numerals as the first exemplary embodiment in the following exemplary embodiments, and same structures are not redundantly detailed. As shown in FIG. 18, compared to the pixel array substrate 132 of the first exemplary embodiment, the first upper coupling capacitor 198a, the first lower coupling capacitor 199a, the sixth upper coupling capacitor 198f and the sixth lower coupling capacitor 199f in the pixel array substrate 210 of the second exemplary embodiment include neither concave nor extension. That is, the capacitances of the first upper coupling capacitor 198a, the first lower coupling capacitor 199a, the sixth upper coupling capacitor 198f, and the sixth lower coupling capacitor 199f are the same. The following description takes the overlapping areas between the first data line 156a and first common line 162 and between the sixth data line 156f and the first common line 162 as an example. As shown in FIG. 19, in the pixel array substrate 210 of the second exemplary embodiment, the first data line 156a and the sixth data line 156f include neither concave nor extension. The overlapping area between the first data line 156a and the first common line 162 and the overlapping area between the sixth data line 156f and the first common line 162 include neither concave nor extension. Analogically, the overlapping area between the first data line 156a and the second common line 164 and the overlapping area between the sixth data line 156f and the second common line 164 include neither concave nor extension.

Figure 20:
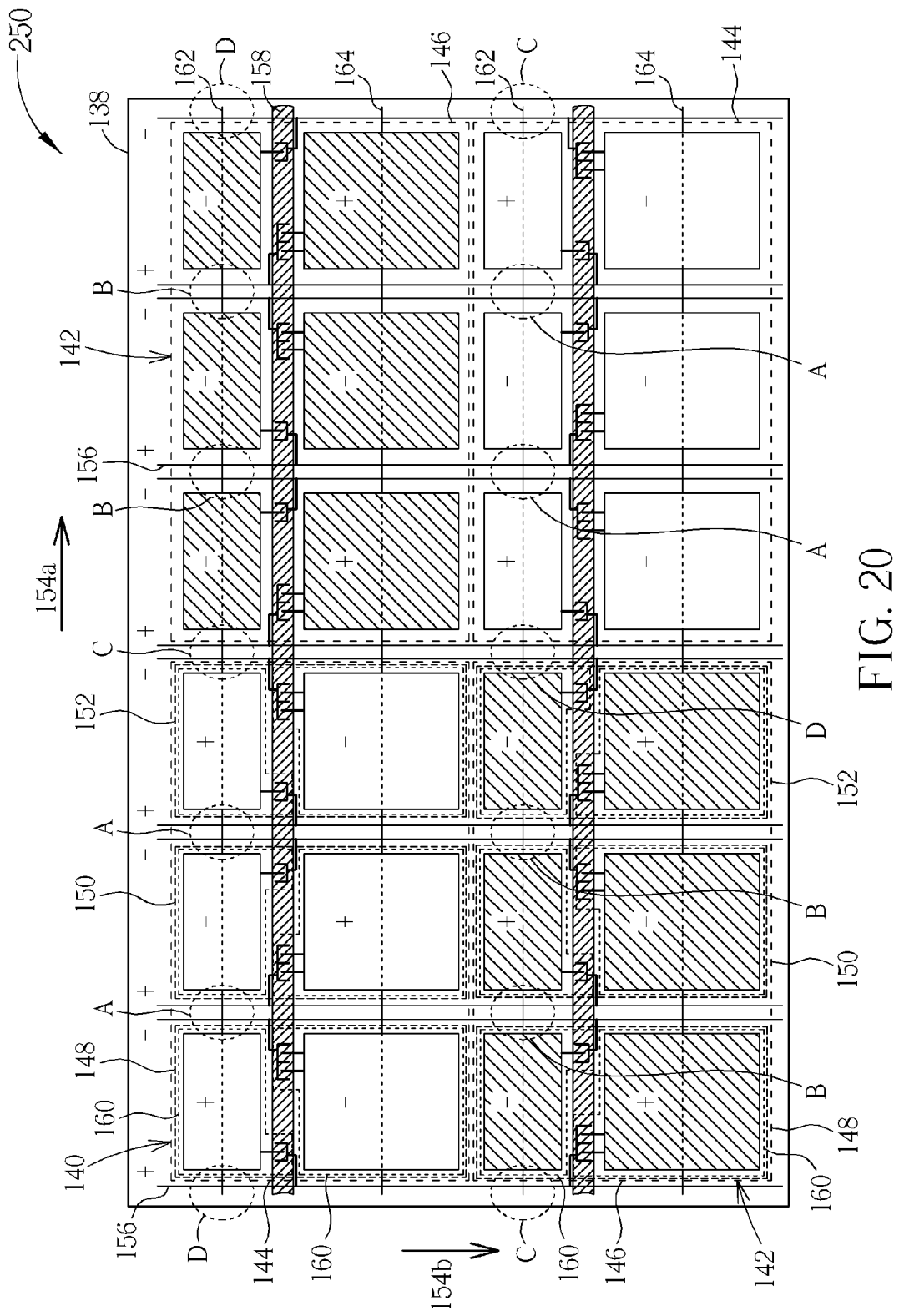
FIG. 20 illustrates a schematic diagram of a top view of a pixel array substrate according to a third exemplary embodiment of the present invention.
Figure 21:
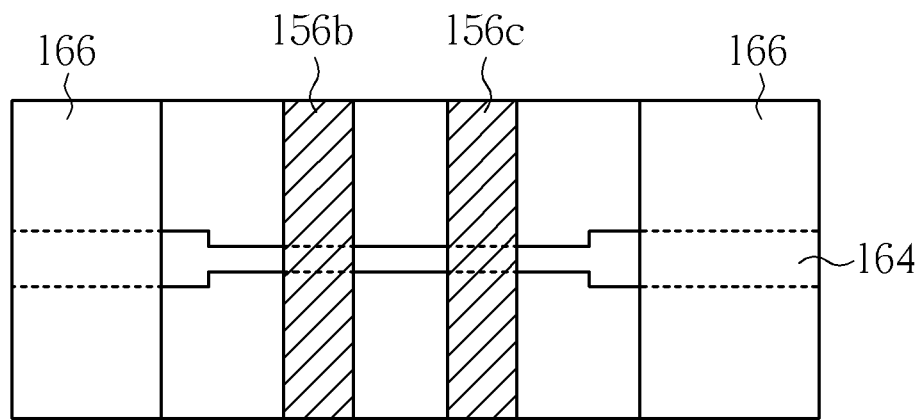
FIG. 21 illustrates a schematic diagram of an overlapping area between a second data line and a second common line, and an overlapping area between a third data line and a second common line according to a third exemplary embodiment of the present invention.

Please refer to FIG. 20 and FIG. 21. FIG. 20 illustrates a schematic diagram of a top view of a pixel array substrate 250 according to a third exemplary embodiment of the present invention. FIG. 21 illustrates a schematic diagram of an overlapping area between the second data line 156b and the second common line 164 and an overlapping area between the third data line 156c and the second common line 164 according to the third exemplary embodiment of the present invention. As shown in FIG. 20, compared to the pixel array substrate 132 of the first exemplary embodiment, the second lower coupling capacitor 199b, the third lower coupling capacitor 199c, the fourth lower coupling capacitor 199d, and the fifth lower coupling capacitor 199e include neither concave nor extension in the pixel array substrate 250 of the third exemplary embodiment. That is, the capacitances of the second lower coupling capacitor 199b, the third lower coupling capacitor 199c, the fourth lower coupling capacitor 199d, and the fifth lower coupling capacitor 199e are the same. The following description takes the overlapping area between the second data line 156b and the second common line and the overlapping area between the third data line 156c and the second common line 164 as an example. As shown in FIG. 21, in the pixel array substrate 250 of the third exemplary embodiment, the second data line 156b and the third data line 156c include neither concave nor extension. The overlapping area between the second data line 156b and the second common line 164 and the overlapping area between the third data line 156c and the second common line 164 include neither concave nor extension. Analogically, the overlapping area between the fourth data line 156d and the second common line 164 and the overlapping area between the fifth data line 156e and the second common line 164 include neither concave nor extension.

Figure 22:
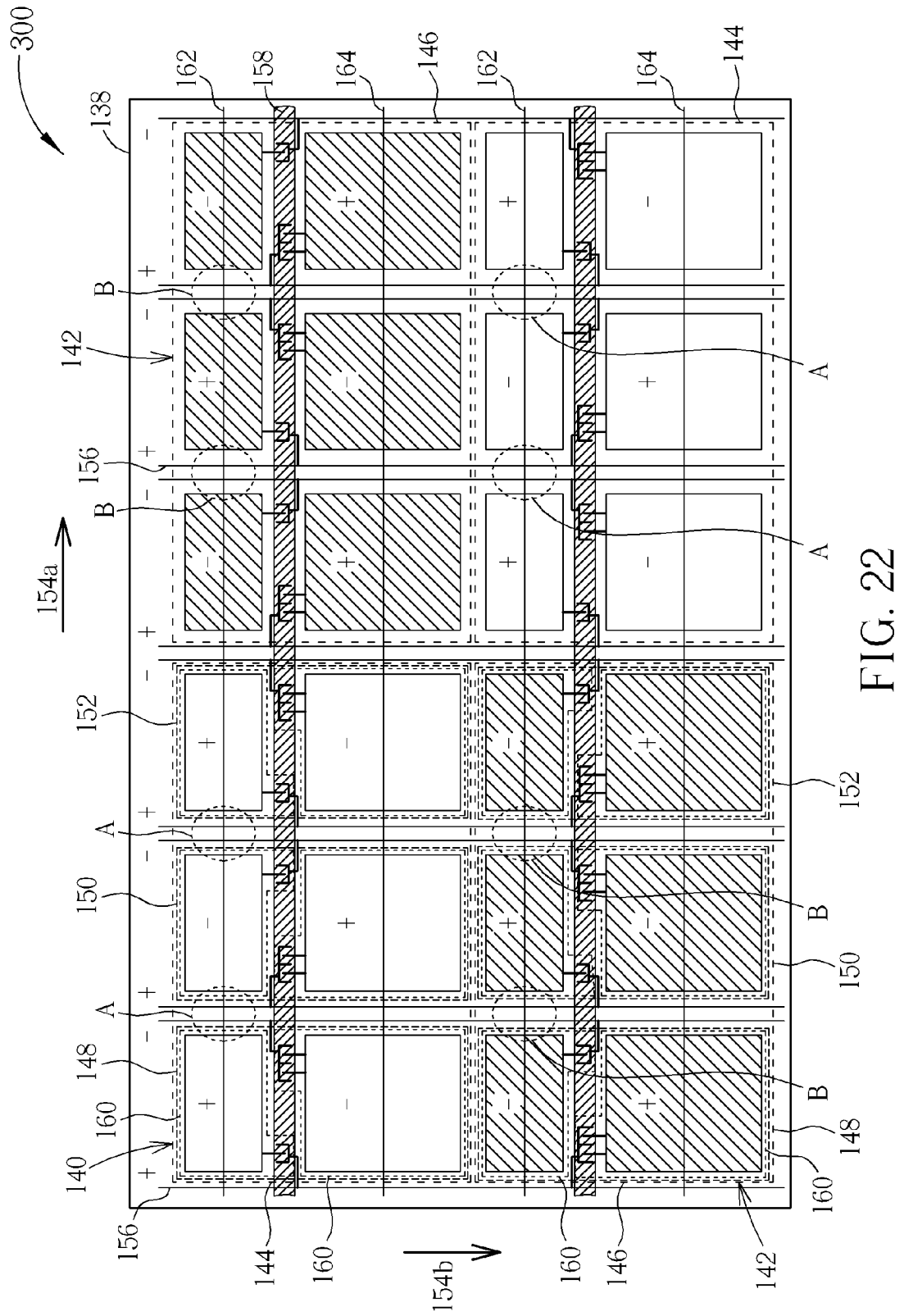
FIG. 22 illustrates a schematic diagram of a top view of a pixel array substrate according to a fourth exemplary embodiment of the present invention.

Please refer to FIG. 22. FIG. 22 illustrates a schematic diagram of a top view of a pixel array substrate 300 according to a fourth exemplary embodiment of the present invention. As shown in FIG. 22, compared to the pixel array substrate 250 of the third exemplary embodiment, the first upper coupling capacitor 198a, the first lower coupling capacitor 199a, the sixth upper coupling capacitor 198f, and the sixth lower coupling capacitor 199f include neither concave nor extension in the pixel array substrate 300 of the fourth exemplary embodiment. That is, in this exemplary embodiment, besides the capacitances of the second lower coupling capacitor 199b, the third lower coupling capacitor 199c, the fourth lower coupling capacitor 199d, and the fifth lower coupling capacitor 199e are the same, and the capacitances of the first upper coupling capacitor 198a, the first lower coupling capacitor 199a, the sixth upper coupling capacitor 198f, and the sixth lower coupling capacitor 199f are the same as well.

Figure 23:
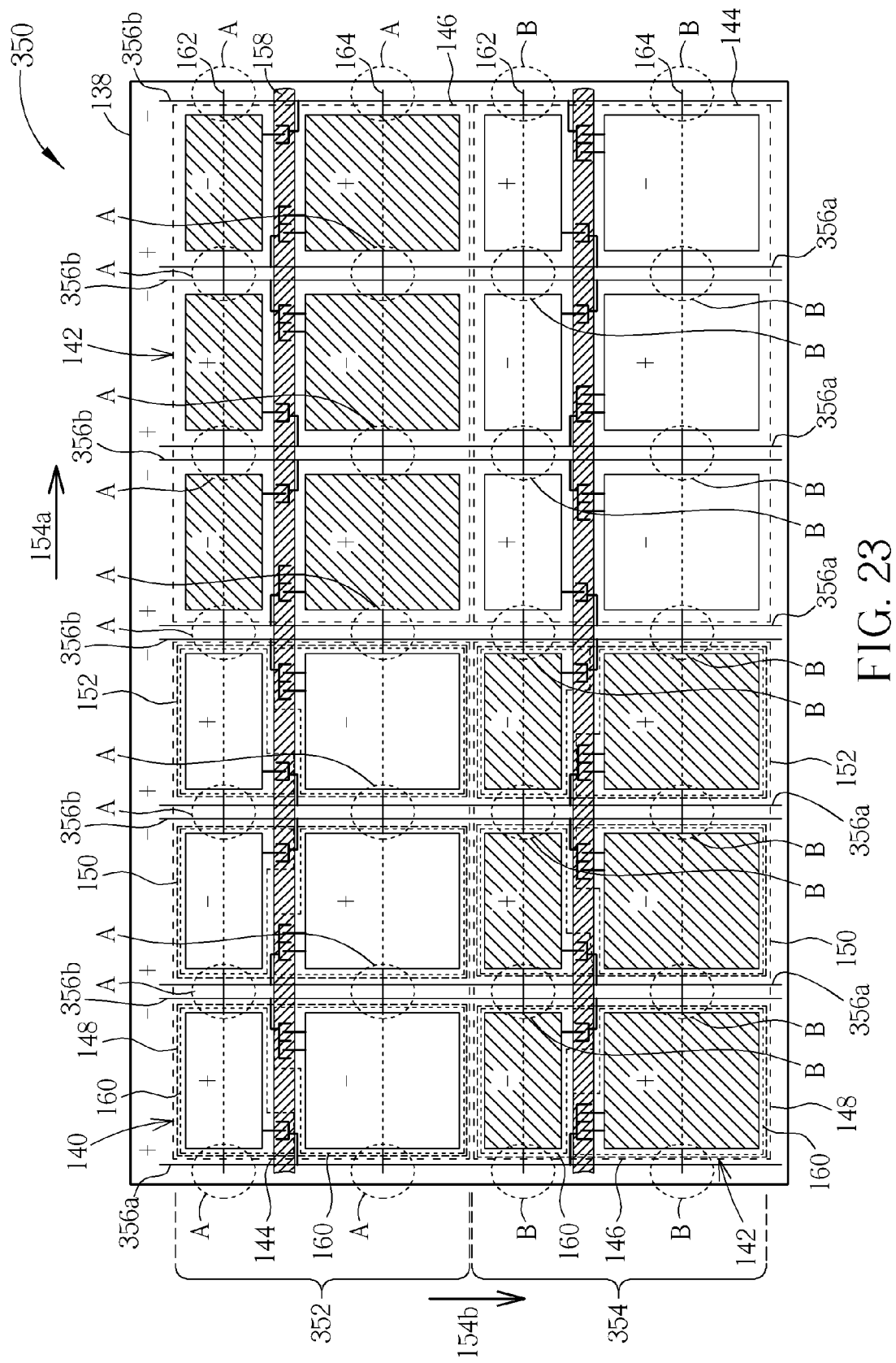
FIG. 23 illustrates a schematic diagram of a top view of a pixel array substrate according to a fifth exemplary embodiment of the present invention.
Figure 24:
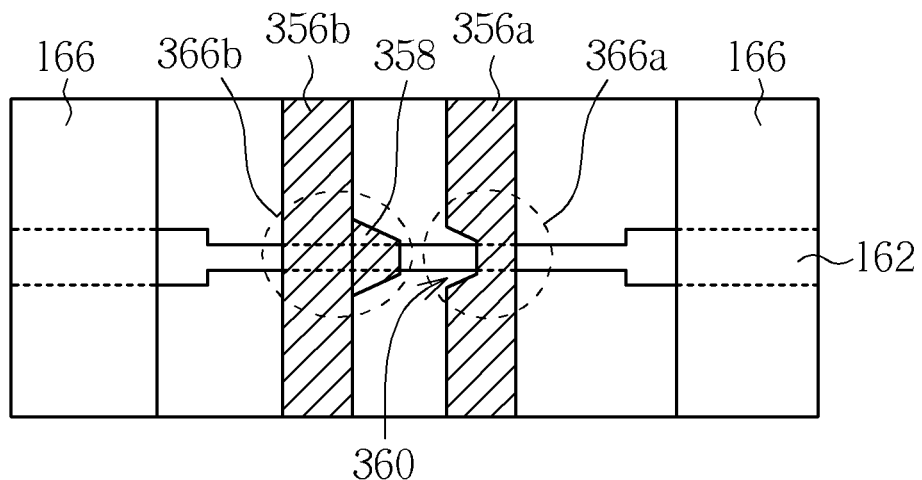
FIG. 24 illustrates a schematic diagram of an enlarged view in region A of FIG. 23.
Figure 25:
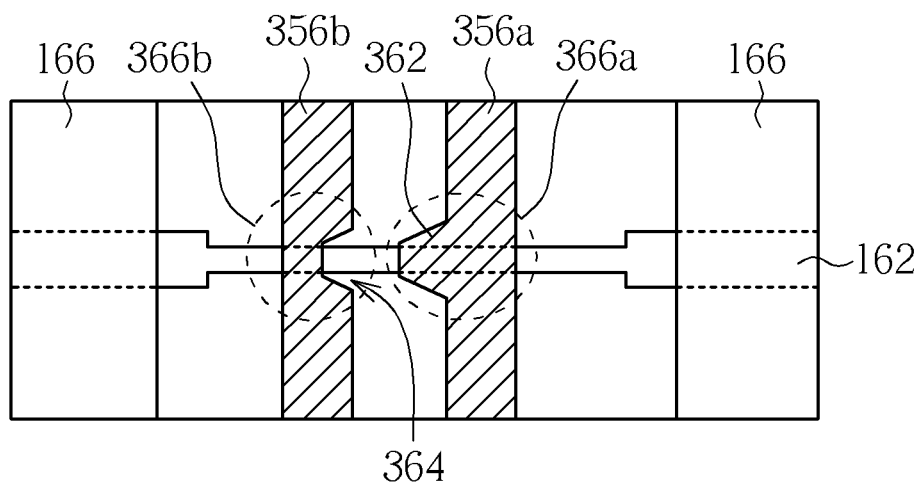
FIG. 25 illustrates a schematic diagram of an enlarged view in region B of FIG. 23.

Please refer to FIG. 23, FIG. 24 and FIG. 25. FIG. 23 illustrates a schematic diagram of a top view of a pixel array substrate 350 according to a fifth exemplary embodiment of the present invention, FIG. 24 illustrates a schematic diagram of an enlarged view in region A of FIG. 23, and FIG. 25 illustrates a schematic diagram of an enlarged view in region B of FIG. 23. As shown in FIG. 23, compared to the pixel array substrate 132 of the first exemplary embodiment, in the pixel array substrate 350 of the fifth exemplary embodiment, a plurality of first pixel groups 352 and a plurality of second pixel groups 354 are disposed on the substrate 138, and the first pixel groups 352 and the second pixel groups 354 are arranged alternatively in sequence along the second direction 154b. Furthermore, each of each first pixel group 352 and each second pixel group 354 includes the first pixel structure 140 and the second pixel structure 142 in a same row respectively, and the data lines 156 include a plurality of odd data lines 356a and a plurality of even data lines 356b. The odd data lines 356a include the first data line 156a, the third data line 156c, and the fifth data line 156e, and the even data lines 356b include the second data line 156b, the fourth data line 156d, and the sixth data line 156f. A first coupling capacitor 366a is formed between the first common line 162 and each odd data line 356a, and a second coupling capacitor 366b is formed between the first common line 162 and each even data line 356b. A third coupling capacitor is formed between the second common line 164 and each odd data line 356a, and a fourth coupling capacitor is formed between the second common line 164 and each even data line 356b. As shown in FIG. 24, in region A of the first pixel group 352, the second coupling capacitor 366b in region A includes at least an extension 358, disposed in the first common line 162 and used for adjusting an overlapping area between the first common line 162 and the even data line 356b to control the capacitance of the second coupling capacitor 366b. In addition, the first coupling capacitor 366a in region A includes at least a concave 360, disposed in the first common line 162 and used for adjusting an overlapping area between the first common line 162 and the odd data line 356a to control the capacitance of the first coupling capacitor 366a. Thus, the capacitance of the first coupling capacitor 366a is smaller than the capacitance of the second coupling capacitor 366b, and analogically, the capacitance of the third coupling capacitor is smaller than the capacitance of the fourth coupling capacitor in region A. As shown in FIG. 25, in region B of the second pixel group 354, the first coupling capacitor 366a in region B includes at least an extension 362, disposed in the first common line 162 and used for adjusting the overlapping area between the first common line 162 and the odd data line 356a to control the capacitance of the first coupling capacitor 366a. Furthermore, the second coupling capacitor 366b in region B includes at least a concave 364, disposed in the first common line 162 and used for adjusting the overlapping area between the first common line 162 and the even data line 356b to control the capacitance of the second coupling capacitor 366b. Thus, the capacitance of the first coupling capacitor 366a is larger than the capacitance of the second coupling capacitor 366b, and analogically, the capacitance of the third coupling capacitor is larger than the capacitance of the fourth coupling capacitor in the region B.

In conclusion, in the pixel structure of the present invention, the first upper coupling capacitor electrically connected to the first upper sub-pixel and the fifth upper coupling capacitor electrically connected to the third upper sub-pixel are smaller than the fourth upper coupling capacitor electrically connected to the second upper sub-pixel, so that the influence of the second upper sub-pixel for displaying green on the common voltage is larger than the influences of the first upper sub-pixel for displaying red and the third upper sub-pixel for displaying blue on the common voltage. Therefore, when the polarities of the first upper sub-pixel and the third upper sub-pixel are different from the polarity of the second upper sub-pixel, the sub-pixels of the pixel structure may have identical pixel voltage by adjusting the first upper coupling capacitor, the fourth upper coupling capacitor and the fifth upper coupling capacitor to solve the greenish problem of the sub-pixels in the pixel structure. Furthermore, the present invention provides the lower coupling capacitor to be larger than the upper coupling capacitor or the upper coupling capacitor to be larger than the lower coupling capacitor, so that the change of the loads of the date lines due to the decrease of the upper coupling capacitor or the lower coupling capacitor could be compensated, and the sub-pixels displaying abnormally are avoided.

Those skilled in the art will readily observe that numerous modifications and alterations of the device and method may be made while retaining the teachings of the invention.

What is claimed is:

1. A pixel structure, disposed on a substrate, the substrate comprising a first sub-pixel region, a second sub-pixel region and a third sub-pixel region, and the pixel structure comprising:
    a plurality of data lines, comprising:
        a first data line, disposed at a side of the first sub-pixel region;
        a second data line and a third data line, disposed between the first sub-pixel region and the second sub-pixel region;
        a fourth data line and a fifth data line, disposed between the second sub-pixel region and the third sub-pixel region; and
        a sixth data line, disposed at a side of the third sub-pixel region;
    a scan line, crossing the data lines, and the scan line passing through the first sub-pixel region, the second sub-pixel region and the third sub-pixel region;
    a first upper sub-pixel, a second upper sub-pixel and a third upper sub-pixel, disposed at an upper side of the scan line in the first sub-pixel region, the second sub-pixel region and the third sub-pixel region respectively, and the first upper sub-pixel, the second upper sub-pixel and the third upper sub-pixel being electrically connected to the scan line, wherein the first upper sub-pixel is electrically connected to the first data line, the second upper sub-pixel is electrically connected to the fourth data line, and the third upper sub-pixel is electrically connected to the fifth data line;
    a first lower sub-pixel, a second lower sub-pixel and a third lower sub-pixel, disposed at a lower side of the scan line in the first sub-pixel region, the second sub-pixel region and the third sub-pixel region respectively, and the first lower sub-pixel, the second lower sub-pixel and the third lower sub-pixel being electrically connected to the scan line, wherein the first lower sub-pixel is electrically connected to the second data line, the second lower sub-pixel is electrically connected to the third data line, and the third lower sub-pixel is electrically connected to the sixth data line;
    a first common line, passing through the first upper sub-pixel, the second upper sub-pixel and the third upper sub-pixel, and partially overlapping the data lines,
    wherein a first upper coupling capacitor is formed between the first common line and the first data line, a second upper coupling capacitor is formed between the first common line and the second data line, a third upper coupling capacitor is formed between the first common line and the third data line, a fourth upper coupling capacitor is formed between the first common line and the fourth data line, a fifth upper coupling capacitor is formed between the first common line and the fifth data line, and a sixth upper coupling capacitor is formed between the first common line and the sixth data line, and
    wherein the third upper coupling capacitor is smaller than the second upper coupling capacitor, and the fifth upper coupling capacitor is smaller than the fourth upper coupling capacitor; and
    a second common line, passing through the first lower sub-pixel, the second lower sub-pixel and the third lower sub-pixel, and partially overlapping the data lines.

2. The pixel structure according to claim 1, wherein each of the first upper sub-pixel, the third upper sub-pixel and the second lower sub-pixel has a first polarity respectively, and each of the second upper sub-pixel, the first lower sub-pixel, and the third lower sub-pixel has a second polarity contrary to the first polarity.

3. The pixel structure according to claim 2, wherein the first polarity comprises a positive polarity and the second polarity comprises a negative polarity.

4. The pixel structure according to claim 2, wherein each of the first data line, the third data line and the fifth data line transfers a display signal with a third polarity respectively, and each of the second data line, the fourth data line and the sixth data line transfers a display signal with a fourth polarity respectively, and wherein the third polarity is the same as the first polarity but contrary to the fourth polarity, and the fourth polarity is the same as the second polarity.

5. The pixel structure according to claim 1, wherein the first sub-pixel region comprises a red sub-pixel region, the second sub-pixel region comprises a green sub-pixel region and the third sub-pixel region comprises a blue sub-pixel region.

6. The pixel structure according to claim 1, wherein each of the third upper coupling capacitor and the fifth upper coupling capacitor comprises a concave respectively, and the concaves are disposed respectively in the first common line or in the third data line and the fifth data line and used for adjusting an overlapping area between the first common line and the third data line and an overlapping area between the first common line and the fifth data line to control capacitances of the third upper coupling capacitor and the fifth upper coupling capacitor.

7. The pixel structure according to claim 1, wherein each of the third upper coupling capacitor and the fifth upper coupling capacitor comprises a capacitor adjusting layer respectively, and the capacitor adjusting layers are disposed respectively between the first common line and the third data line, and between the first common line and the fifth data line and used for controlling capacitances of the third upper coupling capacitor and the fifth upper coupling capacitor.

8. The pixel structure according to claim 1, wherein each of the second upper coupling capacitor and the fourth upper coupling capacitor comprises an extension respectively, and the extensions are disposed respectively in the first common line, or in the second data line and the fourth data line and used for adjusting an overlapping area between the first common line and the second data line and an overlapping area between the first common line and the fourth data line to control capacitances of the second upper coupling capacitor and the fourth upper coupling capacitor.

9. The pixel structure according to claim 1, wherein a first lower coupling capacitor is formed between the second common line and the first data line, a second lower coupling capacitor is formed between the second common line and the second data line, a third lower coupling capacitor is formed between the second common line and the third data line, a fourth lower coupling capacitor is formed between the second common line and the fourth data line, a fifth lower coupling capacitor is formed between the second common line and the fifth data line, and a sixth lower coupling capacitor is formed between the second common line and the sixth data line, and wherein the third lower coupling capacitor is larger than the second lower coupling capacitor, and the fifth lower coupling capacitor is larger than the fourth lower coupling capacitor.

10. The pixel structure according to claim 9, wherein each of the second lower coupling capacitor and the fourth lower coupling capacitor comprises a concave respectively, and the concaves are disposed respectively in the second common line, or in the second data line and the fourth data line and used for adjusting an overlapping area between the second common line and the second data line and an overlapping area between the second common line and the fourth data line to control capacitances of the second lower coupling capacitor and the fourth lower coupling capacitor.

11. The pixel structure according to claim 9, wherein each of the third lower coupling capacitor and the fifth lower coupling capacitor comprises an extension respectively, and the extensions are disposed respectively in the second common line, or in the third data line and the fifth data line and used for adjusting an overlapping area between the second common line and the third data line and an overlapping area between the second common line and the fifth data line to control capacitances of the third lower coupling capacitor and the fifth lower coupling capacitor.

12. The pixel structure according to claim 9, wherein the first lower coupling capacitor is larger than the first upper coupling capacitor, and the sixth upper coupling capacitor is larger than the sixth lower coupling capacitor.

13. The pixel structure according to claim 1, wherein a first adjusting capacitor is formed between the scan line and the first data line, a second adjusting capacitor is formed between the scan line and the fourth data line, a third adjusting capacitor is formed between the scan line and the fifth data line, and the second adjusting capacitor is smaller than the first adjusting capacitor and the third adjusting capacitor.

14. The pixel structure according to claim 13, wherein a fourth adjusting capacitor is formed between the scan line and the second data line, a fifth adjusting capacitor is formed between the scan line and the third data line, a sixth adjusting capacitor is formed between the scan line and the sixth data line, and the fifth adjusting capacitor is smaller than the fourth adjusting capacitor and the sixth adjusting capacitor.

15. A pixel array substrate, comprising:
a substrate, comprising a plurality of first pixel regions and a plurality of second pixel regions, the first pixel regions and the second pixel regions being arranged as a matrix, wherein in the same row or in the same column, each first pixel region and each second pixel region are arranged alternatively in sequence, and each of each first pixel region and each second pixel region respectively has a first sub-pixel region, a second sub-pixel region and a third sub-pixel region defined therein; and
a plurality of first pixel structures and a plurality of second pixel structures, disposed on the substrate, each first pixel structure being disposed respectively in each first pixel region, each second pixel structure being disposed respectively in each second pixel region, each of each first pixel structure and each second pixel structure respectively comprising:
a plurality of data lines, comprising:
a first data line, disposed at a side of the first sub-pixel region;
a second data line and a third data line, disposed between the first sub-pixel region and the second sub-pixel region;
a fourth data line and a fifth data line, disposed between the second sub-pixel region and the third sub-pixel region; and
a sixth data line, disposed at a side of the third sub-pixel region;
a scan line, crossing the data lines, and the scan line passing through the first sub-pixel region, the second sub-pixel region and the third sub-pixel region;
a first upper sub-pixel, a second upper sub-pixel and a third upper sub-pixel, disposed at an upper side of the scan line in the first sub-pixel region, the second sub-pixel region and the third sub-pixel region respectively, and the first upper sub-pixel, the second upper sub-pixel and the third upper sub-pixel being electrically connected to the scan line, wherein in each first pixel structure, the first upper sub-pixel is electrically connected to the first data line, the second upper sub-pixel is electrically connected to the fourth data line, and the third upper sub-pixel is electrically connected to the fifth data line, and wherein in each second pixel structure, the first upper sub-pixel is electrically connected to the second data line, the second upper sub-pixel is electrically connected to the third data line, and the third upper sub-pixel is electrically connected to the sixth data line;
a first lower sub-pixel, a second lower sub-pixel and a third lower sub-pixel, disposed at a lower side of the scan line in the first sub-pixel region, the second sub-pixel region and the third sub-pixel region respectively, and the first lower sub-pixel, the second lower sub-pixel and the third lower sub-pixel being electrically connected to the scan line, wherein in each first pixel structure, the first lower sub-pixel is electrically connected to the second data line, the second lower sub-pixel is electrically connected to the third data line, and the third lower sub-pixel is electrically connected to the sixth data line, and wherein in each second pixel structure, the first lower sub-pixel is electrically connected to the first data line, the second lower sub-pixel is electrically connected to the fourth data line, and the third lower sub-pixel is electrically connected to the fifth data line;
a first common line, passing through the first upper sub-pixel, the second upper sub-pixel and the third upper sub-pixel, and partially overlapping the data lines, wherein a first upper coupling capacitor is formed between the first common line and the first data line, a second upper coupling capacitor is formed between the first common line and the second data line, a third upper coupling capacitor is formed between the first common line and the third data line, a fourth upper coupling capacitor is formed between the first common line and the fourth data line, a fifth upper coupling capacitor is formed between the first common line and the fifth data line, and a sixth upper coupling capacitor is formed between the first common line and the sixth data line, and wherein in each first pixel structure, the third upper coupling capacitor is smaller than the second upper coupling capacitor, and the fifth upper coupling capacitor is smaller than the fourth upper coupling capacitor; and
a second common line, passing through the first lower sub-pixel, the second lower sub-pixel and the third lower sub-pixel, and partially overlapping the data lines.

16. The pixel array substrate according to claim 15, wherein in each first pixel structure, each of the first upper sub-pixel, the third upper sub-pixel and the second lower sub-pixel has a first polarity respectively, and each of the second upper sub-pixel, the first lower sub-pixel, and the third lower sub-pixel has a second polarity contrary to the first polarity.

17. The pixel array substrate according to claim 16, wherein in each second pixel structure, each of the first upper sub-pixel, the third upper sub-pixel and the second lower sub-pixel have the second polarity respectively, and each of the second upper sub-pixel, the first lower sub-pixel, and the third lower sub-pixel has the first polarity.

18. The pixel array substrate according to claim 17, wherein the first polarity comprises a positive polarity and the second polarity comprises a negative polarity.

19. The pixel array substrate according to claim 17, wherein each of the first data line, the third data line and the fifth data line transfers a display signal with a third polarity respectively, and each of the second data line, the fourth data line and the sixth data line transfers a display signal with a fourth polarity respectively, and wherein the third polarity is the same as the first polarity but contrary to the fourth polarity, and the fourth polarity is the same as the second polarity.

20. The pixel array substrate according to claim 15, wherein each first sub-pixel region comprises a red sub-pixel region, each second sub-pixel region comprises a green sub-pixel region, and each third sub-pixel region comprises a blue sub-pixel region.

21. The pixel array substrate according to claim 15, wherein in each first pixel structure, each of the third upper coupling capacitor and the fifth upper coupling capacitor comprises a concave respectively, and the concaves are disposed respectively in the first common line, or in the third data line and the fifth data line and used for adjusting an overlapping area between the first common line and the third data line and an overlapping area between the first common line and the fifth data line to control capacitances of the third upper coupling capacitor and the fifth upper coupling capacitor.

22. The pixel array substrate according to claim 15, wherein in each first pixel structure, each of the third upper coupling capacitor and the fifth upper coupling capacitor comprises a capacitor adjusting layer respectively, and the capacitor adjusting layers are disposed respectively between the first common line and the third data line, and between the first common line and the fifth data line and used for controlling capacitances of the third upper coupling capacitor and the fifth upper coupling capacitor.

23. The pixel array substrate according to claim 15, wherein in each first pixel structure, each of the second upper coupling capacitor and the fourth upper coupling capacitor comprises an extension respectively, and the extensions are disposed respectively in the first common line, or in the second data line and the fourth data line and used for adjusting an overlapping area between the first common line and the second data line and an overlapping area between the first common line and the fourth data line to control capacitances of the second upper coupling capacitor and the fourth upper coupling capacitor.

24. The pixel array substrate according to claim 15, wherein in each second pixel structure, the second upper coupling capacitor is smaller than the third upper coupling capacitor, and the fourth upper coupling capacitor is smaller than the fifth upper coupling capacitor.

25. The pixel array substrate according to claim 15, wherein a first lower coupling capacitor is formed between each second common line and each first data line, a second lower coupling capacitor is formed between each second common line and each second data line, a third lower coupling capacitor is formed between each second common line and each third data line, a fourth lower coupling capacitor is formed between each second common line and each fourth data line, a fifth lower coupling capacitor is formed between each second common line and each fifth data line, and a sixth lower coupling capacitor is formed between each second common line and each sixth data line.

26. The pixel array substrate according to claim 25, wherein in each first pixel structure, the first lower coupling capacitor is larger than the first upper coupling capacitor, and the sixth upper coupling capacitor is larger than the sixth lower coupling capacitor.

27. The pixel array substrate according to claim 25, wherein in each second pixel structure, the first lower coupling capacitor is smaller than the first upper coupling capacitor, and the sixth upper coupling capacitor is smaller than the sixth lower coupling capacitor.

28. The pixel array substrate according to claim 25, wherein in each first pixel structure, the third lower coupling capacitor is larger than the second lower coupling capacitor, and the fifth lower coupling capacitor is larger than the fourth lower coupling capacitor.

29. The pixel array substrate according to claim 28, wherein in each second pixel structure, the third lower coupling capacitor is smaller than the second lower coupling capacitor, and the fifth lower coupling capacitor is smaller than the fourth lower coupling capacitor.

30. The pixel array substrate according to claim 29, wherein in each first pixel structure, the first lower coupling capacitor is larger than the first upper coupling capacitor, and the sixth upper coupling capacitor is larger than the sixth lower coupling capacitor.

31. The pixel array substrate according to claim 30, wherein in each second pixel structure, the first lower coupling capacitor is smaller than the first upper coupling capacitor, and the sixth upper coupling capacitor is smaller than the sixth lower coupling capacitor.

32. The pixel array substrate according to claim 28, wherein in each first pixel structure, each of the second lower coupling capacitor and the fourth lower coupling capacitor comprises a concave respectively, and the concaves are disposed respectively in the second common line, or in the second data line and the fourth data line and used for adjusting an overlapping area between the second common line and the second data line and an overlapping area between the second common line and the fourth data line to control capacitance of the second lower coupling capacitor and the fourth lower coupling capacitor.

33. The pixel array substrate according to claim 28, wherein in each first pixel structure, each of the third lower coupling capacitor and the fifth lower coupling capacitor comprises an extension respectively, and the extensions are disposed in the second common line, or in the third data line and the fifth data line and used for adjusting an overlapping area between the second common line and the third data line and an overlapping area between the second common line and the fifth data line to control capacitances of the third lower coupling capacitor and the fifth lower coupling capacitor.

34. The pixel array substrate according to claim 25, wherein in each first pixel structure, the second upper coupling capacitor is larger than the second lower coupling capacitor, the third lower coupling capacitor is larger than the third upper coupling capacitor, the fourth upper coupling capacitor is larger than the fourth lower coupling capacitor, and the fifth lower coupling capacitor is larger than the fifth upper coupling capacitor.

35. The pixel array substrate according to claim 34, wherein in each second pixel structures, the second upper coupling capacitor is smaller than the second lower coupling capacitor, the third lower coupling capacitor is smaller than the third upper coupling capacitor, the fourth upper coupling capacitor is smaller than the fourth lower coupling capacitor, and the fifth lower coupling capacitor is smaller than the fifth upper coupling capacitor.

36. The pixel array substrate according to claim 15, wherein a first adjusting capacitor is formed between each scan line and each first data line, a second adjusting capacitor is formed between each scan line and each fourth data line, a third adjusting capacitor is formed between each scan line and each fifth data line, and each second adjusting capacitor is smaller than each first adjusting capacitor and each third adjusting capacitor.

37. The pixel array substrate according to claim 15, wherein a fourth adjusting capacitor is formed between each scan line and each second data line, a fifth adjusting capacitor is formed between each scan line and each third data line, a sixth adjusting capacitor is formed between each scan line and each sixth data line, and each fifth adjusting capacitor is smaller than each fourth adjusting capacitor and each sixth adjusting capacitor.

38. A liquid crystal display panel, comprising:
   a first substrate, comprising a plurality of first pixel regions and a plurality of second pixel regions, the first pixel regions and the second pixel regions being arranged as a matrix, wherein in the same row or in the same column, each first pixel region and each second pixel region are arranged alternatively in sequence, and each of each first pixel region and each second pixel region respectively has a first sub-pixel region, a second sub-pixel region and a third sub-pixel region defined therein;
   a plurality of first pixel structures and a plurality of second pixel structures, disposed on the first substrate, each first pixel structure being disposed respectively in each first pixel region, each second pixel structure being disposed respectively in each second pixel region, each of each first pixel structure and each second pixel structure respectively comprising:
      a plurality of data lines, comprising:
         a first data line, disposed at a side of the first sub-pixel region;
         a second data line and a third data line, disposed between the first sub-pixel region and the second sub-pixel region;
         a fourth data line and a fifth data line, disposed between the second sub-pixel region and the third sub-pixel region; and
         a sixth data line, disposed at a side of the third sub-pixel region;
      a scan line, crossing the data lines, and the scan line passing through the first sub-pixel region, the second sub-pixel region and the third sub-pixel region;
      a first upper sub-pixel, a second upper sub-pixel and a third upper sub-pixel, disposed at an upper side of the scan line in the first sub-pixel region, the second sub-pixel region and the third sub-pixel region respectively, and the first upper sub-pixel, the second upper sub-pixel and the third upper sub-pixel being electrically connected to the scan line, wherein in each first pixel structure, the first upper sub-pixel is electrically connected to the first data line, the second upper sub-pixel is electrically connected to the fourth data line, and the third upper sub-pixel is electrically connected to the fifth data line, and wherein in each second pixel structure, the first upper sub-pixel is electrically connected to the second data line, the second upper sub-pixel is electrically connected to the third data line, and the third upper sub-pixel is electrically connected to the sixth data line;
      a first lower sub-pixel, a second lower sub-pixel and a third lower sub-pixel, disposed at a lower side of the scan line in the first sub-pixel region, the second sub-pixel region and the third sub-pixel region respectively, and the first lower sub-pixel, the second lower sub-pixel and the third lower sub-pixel being electrically connected to the scan line, wherein in each first pixel structures, the first lower sub-pixel is electrically connected to the second data line, the second lower sub-pixel is electrically connected to the third data line, and the third lower sub-pixel is electrically connected to the sixth data line, and wherein in each second pixel structure, the first lower sub-pixel is electrically connected to the first data line, the second lower sub-pixel is electrically connected to the fourth data line, and the third lower sub-pixel is electrically connected to the fifth data line;
      a first common line, passing through the first upper sub-pixel, the second upper sub-pixel and the third upper sub-pixel, and partially overlapping the data lines, wherein a first upper coupling capacitor is formed between the first common line and the first data line, a second upper coupling capacitor is formed between the first common line and the second data line, a third upper coupling capacitor is formed between the first common line and the third data line, a fourth upper coupling capacitor is formed between the first common line and the fourth data line, a fifth upper coupling capacitor is formed between the first common line and the fifth data line, and a sixth upper coupling capacitor is formed between the first common line and the sixth data line, and in each first pixel structure, the third upper coupling capacitor is smaller than the second upper coupling capacitor, and the fifth upper coupling capacitor is smaller than the fourth upper coupling capacitor; and
      a second common line, passing through the first lower sub-pixel, the second lower sub-pixel and the third lower sub-pixel, and partially overlapping the data lines;
   a second substrate, disposed opposite to the first substrate; and
   a liquid crystal layer, disposed between the first substrate and the second substrate.

* * * * *